United States Patent [19]

McHale et al.

[11] Patent Number: 4,841,933
[45] Date of Patent: Jun. 27, 1989

[54] ADAPTIVE CONTROL SYSTEM FOR AN INTERNAL COMBUSTION ENGINE

[75] Inventors: Anthony McHale, Birmingham; Andrew P. Frith, London, both of England

[73] Assignee: Lucas Industries Public Limited Company, Birmingham, England

[21] Appl. No.: 139,301

[22] Filed: Dec. 29, 1987

[30] Foreign Application Priority Data

Jan. 14, 1987 [GB] United Kingdom ............... 8700758

[51] Int. Cl.⁴ ............................................. F02P 5/08
[52] U.S. Cl. .................................... 123/419; 123/417
[58] Field of Search ............... 123/417, 419, 436, 415, 123/416, 418; 364/431.05, 431.04

[56] References Cited

U.S. PATENT DOCUMENTS

| | | | |
|---|---|---|---|
| 4,379,333 | 4/1983 | Ninomiya et al. | 123/417 |
| 4,389,992 | 6/1983 | Shigamutsu et al. | 123/419 |
| 4,448,162 | 5/1984 | Ninomiya et al. | 123/419 |
| 4,467,765 | 8/1984 | Suzuki et al. | 123/419 |
| 4,596,217 | 6/1986 | Bonitz et al. | 123/417 |
| 4,715,344 | 12/1987 | Tomigawa | 123/417 |

OTHER PUBLICATIONS

"Tracking of Slowly Varying Parameters by Directional Forgetting" IFAC Congress, Budapest 1984.

Primary Examiner—Raymond A. Nelli
Attorney, Agent, or Firm—Nixon & Vanderhye

[57] ABSTRACT

An adaptive control system and method for a multi-cylinder internal combustion engine is provided wherein a perturbation generator perturbs an engine control parameter of a cylinder about a base-line value, and a measuring means measures the slope of an engine output with respect to perturbations in the engine control parameter caused by the perturbation generator. A correction unit employs the measured slope to correct at least one engine control parameter of the engine so as to obtain a desired value of the slope measured by the measuring means. The corrected control parameter can be the same or different from the perturbed control parameter. The perturbation generator operates in a first perturbation mode in an upper speed range of the engine and in a second perturbation mode in a lower speed range of the engine. The slope measuring unit operates in different measurement modes corresponding to these perturbation modes.

46 Claims, 17 Drawing Sheets

TO FIG. 1(b)

INTERRUPT HIERARCHY

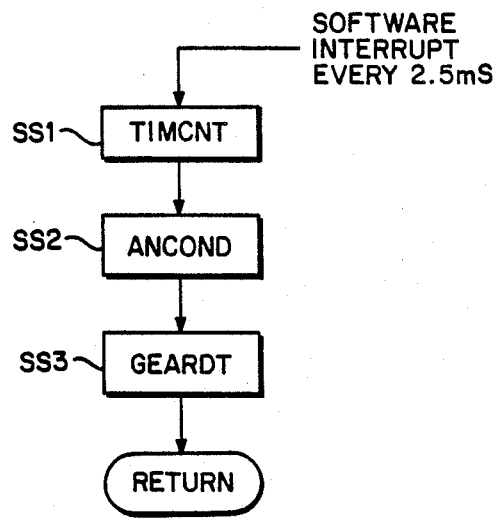
*FIG. 10*
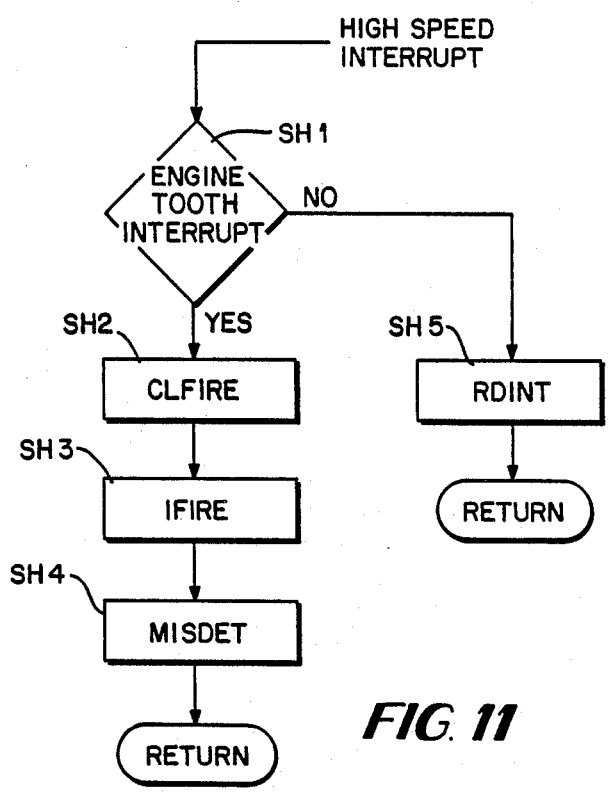
*FIG. 11*
*FIG. 13*
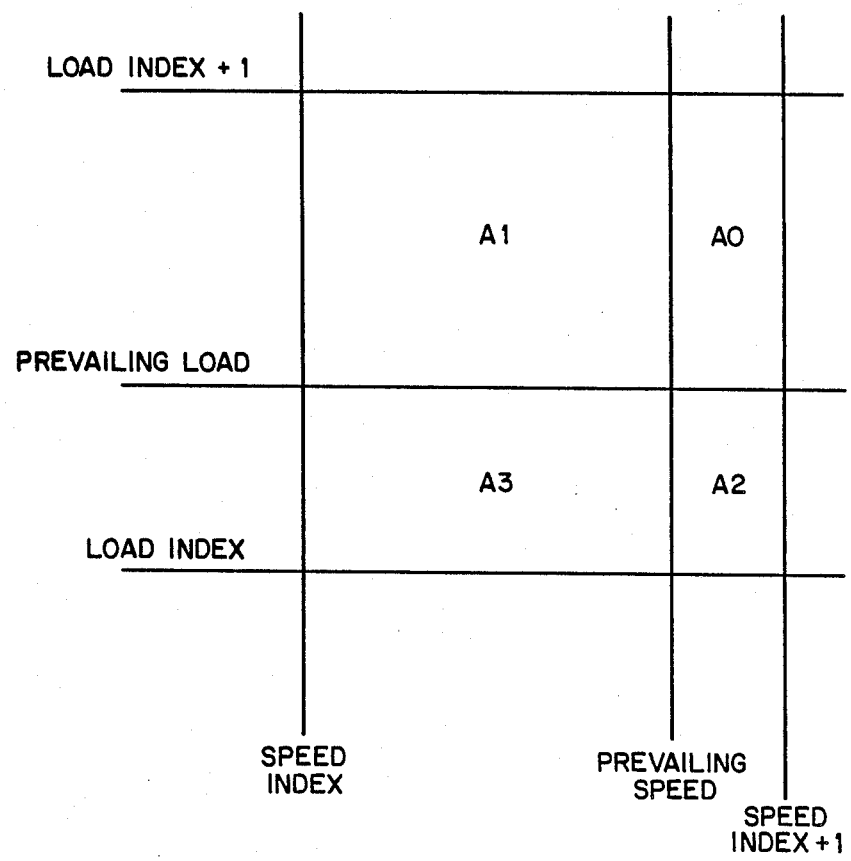

ADAPTIVE CONTROL SYSTEM FOR AN INTERNAL COMBUSTION ENGINE

FIELD OF THE INVENTION

This invention relates to an adaptive control system for an internal combustion engine and also to a method of controlling such an engine.

BACKGROUND OF THE INVENTION

In operating an internal combustion engine, it is necessary to establish various control parameters. Such control parameters may include the quantity of fuel supplied to each cylinder prior to combustion and also the spark advance angle. Until recently, such control parameters were established by mechanical devices responsive to various engine operating parameters. Careful testing of engines shows that optimum values for these control parameters are complex functions of the operating parameters and that these functions cannot be matched by mechanical devices. Modern engine control systems use empirically derived characteristics for the control parameters which are stored as look-up tables in read only memories.

Although these look-up tables provide a much closer match to the optimum characteristics than was achieved by the mechanical devices, they still do not achieve optimum values for the control parameters. There are a number of reasons for this. These reasons include variations between test engines and production engines and also various aging effects which occur during the life of an engine.

In U.S. Pat. No. 4,379,333, incorporated by reference herein, there is described an adaptive control system for controlling the spark advance angle. In this system, small positive and negative perturbations are superimposed on the spark advance angle and the resulting changes in speed are used to determine the differential or slope of engine output with respect to spark advance angle. The slope is used to update the spark advance angles stored in a look-up table.

In the arrangement described in this patent, the perturbations are imposed in a three phase cycle, a positive perturbation being imposed during a first phase, no perturbations being imposed during the next phase, and a negative perturbation being imposed in the last phase. Each phase comprises 40 to 60 engine fires. The engine speed is sensed over a number of engine fires at the end of each phase. The perturbation of the spark advance angle will cause an initial transient response in the engine speed at the beginning of the phase, but, by the end of the phase, a steady speed response is obtained. Thus, by delaying measurement of the engine speed until the end of the phase, the transient response is eliminated. However, this method suffers from the disadvantage that a large number of engine fires is required to make each slope measurement.

There is one further important disadvantage of the arrangement described in this patent. In this patent, during each measurement phase, the perturbations are applied to all the cylinders of the engine. Similarly, there is a single spark advance look-up table for all cylinders. In practice, there are significant variations between the individual cylinders of an engine, and so there are significant differences between the optimum values for the various control parameters between the various cylinders. The case of spark advance angle may be considered by way of illustration. Where a single spark advance value is used for all cylinders, then under particular operating conditions there will be an optimum spark advance angle at which maximum torque output is achieved. Similarly, for each individual cylinder, there is also an optimum spark advance angle for achieving maximum torque output. This angle will not, in general, be identical for each cylinder.

SUMMARY OF THE INVENTION

It is accordingly an object of this invention to provide a new or improved adaptive control system for an internal combustion engine and also a method of controlling such an engine in which the above-mentioned disadvantages are overcome or reduced.

According to an embodiment of the present invention, there is provided an adaptive control system for a power producing engine having at least one engine control parameter affecting and an engine output and having a drive train combination having at least one resonant frequency. The control system includes a perturbation generator for perturbing intermittently a particular engine control parameter about a base line value in at least one perturbation mode in a given operating mode of the engine which includes said resonant frequency. A measuring means measures the slope or differential of the engine output with respect to the particular control parameter. A control means, responsive to the slope measured by the measuring means, controls one of the engine control parameters so as to obtain a desired value of the slope. The perturbation generator can operate in a further perturbation mode in a further operating mode of the engine to perturb the particular control parameter at a frequency greater than said resonant frequency. The perturbation generator in said at least one perturbation mode can (a) perturb the particular control parameter with a first perturbation, (b) permit a predetermined period to elapse without perturbing the particular control parameter, (c) apply a second perturbation of opposite polarity to that of said first perturbation, and (d) permit another predetermined period to elapse without perturbing said particular control parameter.

The system can operate such that the measuring means in a measurement mode corresponding to said at least one perturbation mode creates a series of measurement windows following each perturbation of the particular control parameter, with each of the series of measurement windows occupying part of an interval between successive perturbations of the particular control parameter. The measuring means calculates the slope in accordance with a change in engine output between adjacent ones of the series of measurement windows.

The aforesaid further perturbation mode can be such that the perturbation generator generates a periodic perturbation waveform having said frequency greater than said resonant frequency and applies a first perturbation to the particular control parameter during a first part of each period of said waveform and a second perturbation of opposite polarity to that of the first perturbation to the particular control parameter during a second part of each period of the waveform. The measuring means in a measurement mode corresponding to the further perturbation mode creates a series of contiguous first and second measurement windows associated respectively with the first part and the second part of the perturbation waveform period, with each measurement window lagging its associated part of said period by a predetermined phase shift.

According to yet another embodiment of the invention, there is provided an adaptive control system for a multi-cylinder internal combustion engine, as follows. The control system includes cylinder combination selection means for establishing a plurality of combinations of cylinders of the engine and for selecting each combination in turn, with each of the combinations of cylinders including at least one cylinder. A perturbation generator perturbs a particular said engine control parameter of each of the combinations of cylinders at the time it is selected by the cylinder combination selection means, with the perturbation generator operating in a first perturbation mode in an upper speed range of the engine and in a second perturbation mode in a lower speed range of the engine. A measuring means measures the slope or differential of an engine output with respect to perturbations in the particular engine control parameter caused by the perturbation generator for each of the cylinder combinations in turn, with the measuring means operating in a first measurement mode corresponding to the first perturbation mode and in a second measurement mode corresponding to the second perturbation mode. A correction means, responsive to the slope measured by the measuring means, corrects at least one engine control parameter for each cylinder of the engine so as to obtain a desired value of the slope. In this embodiment, the perturbation generator in the first perturbation mode generates a periodic perturbation waveform and applies a first perturbation to the particular engine control parameter during a first part of each period of the perturbation wave form and a second perturbation of opposite polarity to that of the first perturbation to the particular engine control parameter during a second part of each period of the perturbation wave form. In the second perturbation mode, the perturbation generator applies a third perturbation to the particular engine control parameter, permits a predetermined period to elapse without perturbing the particular engine control parameter, applies a fourth perturbation of opposite polarity to that of the third perturbation to the particular engine control parameter, and permits another predetermined period to elapse without perturbing the engine control parameter. In the first measurement mode, the measuring means creates a first series of contiguous first and second measurement windows associated respectively with the first part and the second part of the period of the perturbation waveform, with each of the measurement windows in the first series lagging its associated part of the period of the perturbation wave form by a predetermined phase shift. The measuring means calculates the slope in accordance with a change in engine output between contiguous ones of the measurement windows in the first series. The measuring means in the second measurement mode creates a second series of measurement windows following each perturbation of the particular engine control parameter, each of the second series of measurement windows occupying part of an interval between successive perturbations of the particular engine control parameter. The measuring means calculates the slope in accordance with a change in engine output between adjacent ones of the second series of measurement windows.

The present invention provides significant advantages over the prior art arrangement discussed previously. If different perturbation frequencies are considered for a control parameter, there will be upper and lower frequency ranges in which the phase shift between the perturbation waveform and the response in engine speed is reasonably stable over various engine operating conditions. Between these two frequency ranges, there is a frequency range in which the phase shift is unstable. In the present invention, in the upper speed range, the perturbation waveform is generated at a frequency which is above the unstable frequency range. In the lower speed range, the perturbed parameter of the selected cylinder combination cannot be perturbed at this high frequency due to the low frequency at which engine fires are occurring. Instead, perturbations of alternate polarity are applied to the perturbed parameter and the resulting transient response to engine speed is examined immediately after each perturbation. Thus, the present invention provides a system in which corrections can be made to individual cylinder combinations at relatively high rates over a wide range of engine speeds.

Usually, the multi-cylinder engine will have a flywheel connected through resilient shafting and a gear arrangement to a load; the flywheel, resilient shafting and gear arrangement forming a resonant system with a particular resonant frequency for each gear ratio established by the gear arrangement.

Conveniently, in the first perturbation mode, the frequency of the waveform is greater than the highest resonant frequency of the resonant system and, in the second perturbation mode, each measurement window is equal to a whole number of quarters of the prevailing resonant period of the resonant system.

Conveniently, in both the first and second measurement modes, the measuring means accumulates during each measurement window, the fire periods whose central points fall within the measurement window to produce a total fire period for that window, and uses the total fire periods to calculate the slope.

The control system may include a third measurement mode which operates when the engine is in neutral or the clutch is disengaged.

In one arrangement, each cylinder combination comprises a single cylinder of the engine.

In another arrangement, each cylinder combination comprises all the cylinders except for one of the engine.

Usually, the or each corrected parameter value is established, prior to correction, as a function of the speed of the engine and the load to which the engine is subjected.

The perturbed parameter may be an ignition timing parameter.

In one arrangement, there is a single corrected parameter and both the perturbed parameter and the corrected parameter are an ignition timing parameter.

In another arrangement, the perturbed parameter is an ignition timing parameter, and there is a single corrected parameter in the form of an engine fuel control parameter.

In a further arrangement, the perturbed parameter is an ignition timing parameter, and there are two corrected parameters in the form of an ignition timing parameter and an engine fuel control parameter.

According to another embodiment of the invention, there is provided a method of controlling a power producing engine having at least one engine control parameter affecting an engine output, with the engine having a drive train combination having at least one resonant frequency. The method includes (a) intermittently perturbing a particular engine control parameter about a base value in at least one perturbation mode in a given operating mode of the engine which includes the resonant frequency; (b) measuring a slope of the engine output with respect to the particular control parameter; and (c) controlling one said control parameter so as to obtain a desired value of the slope. The method can further comprise perturbing the particular control parameter in another perturbation mode in another operating mode of the engine at a frequency greater than said resonant frequency. Step (a) can include in the at least one perturbation mode (1) perturbing the particular control parameter with a first perturbation, (2) permitting a predetermined period to elapse without perturbing the particular control parameter, (3) perturbing the particular control parameter with a second perturbation having a polarity opposite to that of the first perturbation, and (4) permitting another predetermined period to elapse without perturbing the particular control parameter. Step (b) can include a measurement mode corresponding to the at least one perturbation mode in which there is created a series of measurement windows following each perturbation of the particular control parameter, each of the series of measurement windows occupying part of an interval between successive perturbations of the particular control parameter and measuring the slope in accordance with a change in engine output between adjacent ones of the series of measurement windows. The aforesaid another perturbation mode can include generating a periodic perturbation waveform having said frequency greater than said resonant frequency and applying a first perturbation to the particular control parameter during a first part of each period of the waveform and a second perturbation of opposite polarity to that of the first perturbation to the particular control parameter during a second part of each period of the waveform.

According to another embodiment of the invention, there is provided a method of controlling a multi-cylinder internal combustion engine having an engine output affected by at least one engine control parameter. The method includes establishing a plurality of combinations of cylinders of the engine, each of the combinations of cylinders including at least one cylinder; selecting each of the combinations in turn; perturbing a particular engine control parameter of each of the combinations of cylinders at the time it is selected by applying a first perturbation to the particular control parameter, permitting a period to elapse without perturbing the particular control parameter, applying a second perturbation of opposite polarity to that of the first perturbation to the particular control parameter and permitting another period to elapse without perturbing the particular control parameter; creating a series of measurement windows following each perturbation of the particular control parameter, each series of measurement windows occupying part of the interval between successive perturbations; calculating the slope of engine output with respect to perturbation in said particular control parameter for each of said combinations in turn from the change in engine output between adjacent measurement windows; and applying a correction based on said slope to at least one said engine control parameter associated with the currently selected cylinder combination.

According to another embodiment of the invention, there is provided a method of controlling a multi-cylinder internal combustion engine having an engine output affected by at least one engine control parameter. The method includes establishing a plurality of combinations of cylinders of the engine, each of the combinations of cylinders including at least one cylinder; selecting each of the combinations in turn; when the engine is in an upper speed range, perturbing a particular engine control parameter of each of the combinations of cylinders at the time it is selected by generating a periodic perturbation waveform and applying a first perturbation to the particular control parameter during a first part of each period of the perturbation waveform and a second perturbation of opposite polarity to that of the first perturbation to the particular control parameter during a second part of each period of the perturbation waveform; when the engine is in a lower speed range, perturbing the particular control parameter of each of the combinations of cylinders at the time it is selected by applying a first perturbation to the particular control parameter, permitting a period to elapse without perturbing the particular control parameter, applying a second perturbation of opposite polarity to that of the first perturbation to the particular control parameter and permitting another period to elapse with perturbing the particular control parameter; in the upper speed range, creating a series of contiguous first and second measurement windows associated respectively with the first and second parts of the perturbation waveform, each measurement window lagging its respective part of the perturbation waveform by a predetermined phase sift; in the lower speed range, creating a series of measurement windows following each perturbation of the particular control parameter, each series of measurement windows occupying part of the interval between successive perturbations; in both the upper and lower speed ranges, calculating the slope of engine output with respect to perturbations in the particular control parameter for each of the combinations in turn from the change in engine speed between adjacent measurement windows; and applying a correction based on the slope to at least one of the engine control parameters associated with the currently selected cylinder combination.

BRIEF DESCRIPTION OF THE DRAWINGS

The above and other objects, advantages and features of the invention will be more fully understood when considered in conjunction with the following discussion and the attached drawings, of which:

FIGS. 9 to 11 are flow charts of parts of the program;

FIG. 13 is a diagram illustrating the calculation of weighting factors used in the program;

DETAILED DESCRIPTION OF THE INVENTION

Figure 2:
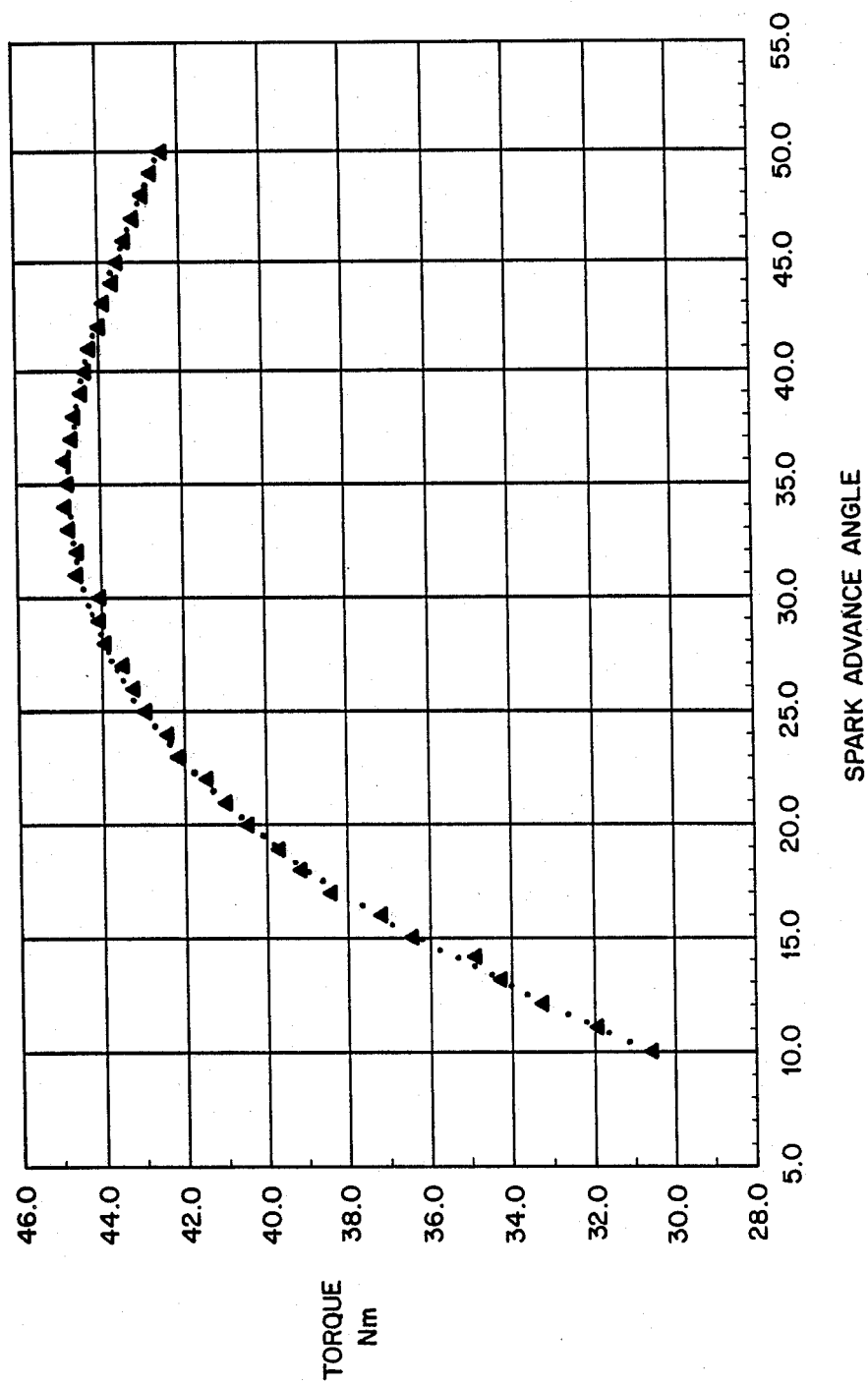
FIG. 2 is a graph showing engine output torque as a function of spark advance angle.

Referring first to FIG. 2, there is shown a graph of engine output torque for a multi-cylinder internal combustion engine as a function of spark advance angle. As may be seen, there is a particular value of spark advance angle at which the torque is a maximum. A similar graph exists for engine torque as a function of spark advance angle for each individual cylinder. In general, the spark advance angle for maximum torque will vary between cylinders. In the embodiment of the invention which is described below, the spark advance angle is corrected for each cylinder so as to achieve maximum torque angle.

Figure 1A:
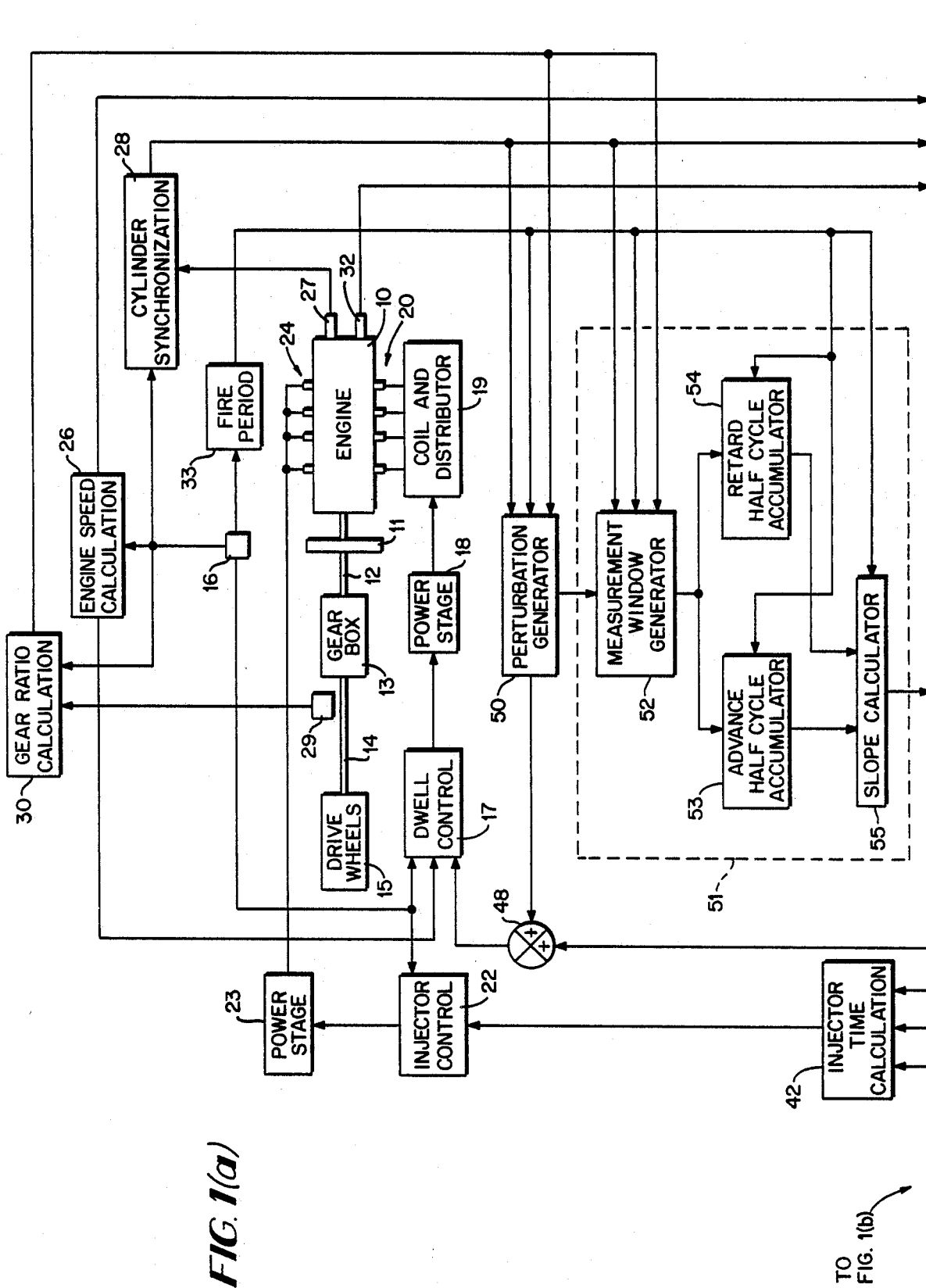
FIG. 1 is a diagram of the functional components of an adaptive control system embodying this invention.
Figure 1B:
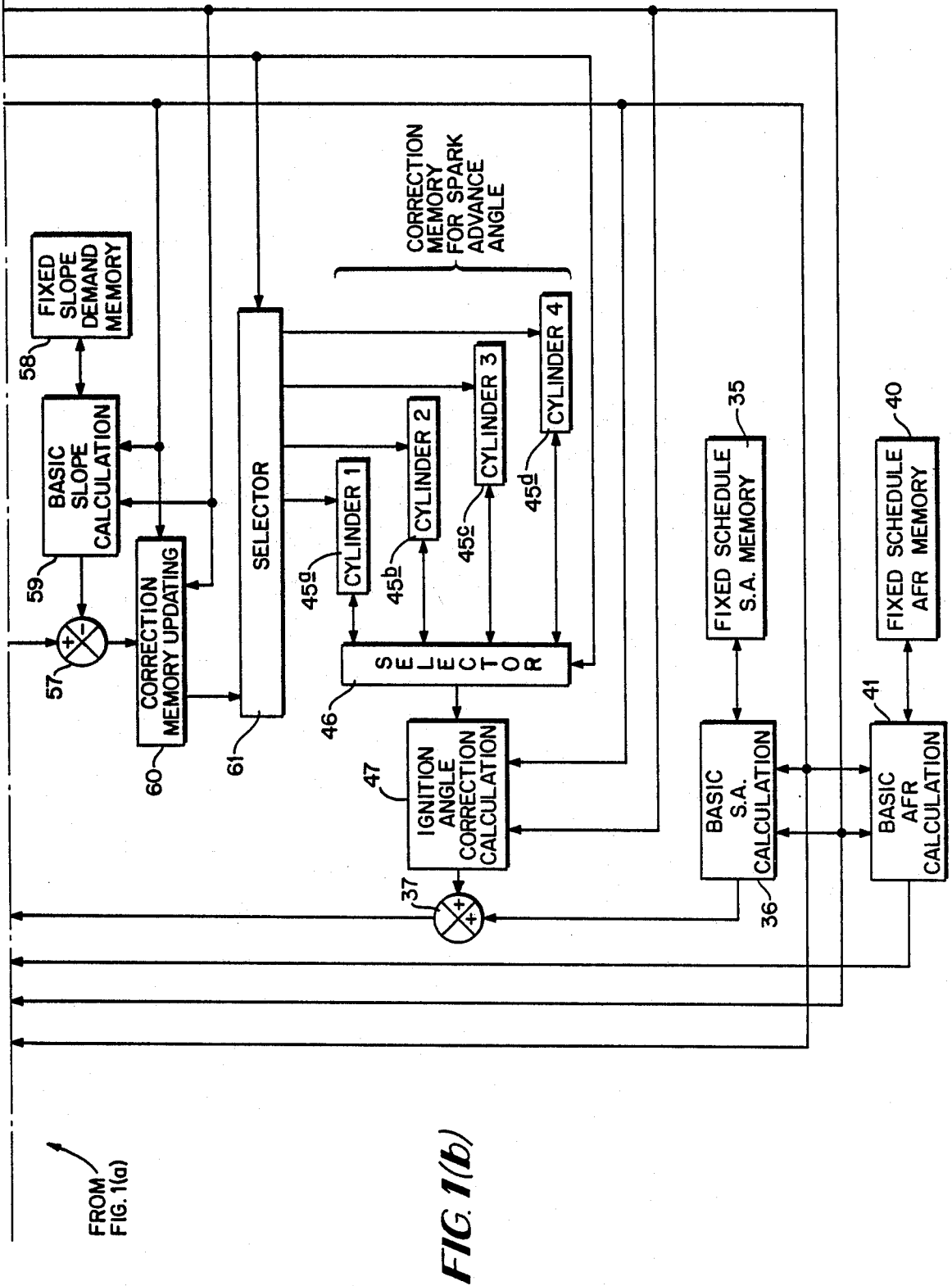

Referring now to FIG. 1, there is shown in functional form an adaptive control system embodying this invention and installed in a motor vehicle. The motor vehicle has a four cylinder fuel injected spark ignition internal combustion engine 10. Engine 10 is provided with a flywheel 11 and is connected through a resilient shaft 12, a gearbox 13, and a further resilient shaft 14 to drive wheels 15 which form a load. Although not shown, a clutch is also provided.

Flywheel 11 is associated with a position transducer 16 which coacts with teeth on flywheel 11 and produces a reference pulse for each 10° of rotation of the engine crankshaft except for two positions where teeth are missing. These two positions are separated by 180° of crankshaft rotation, and each corresponds to the instant when a piston in a respective cylinder is at its top dead center position.

The pulses from transducer 16 are supplied to a dwell control device 17, the output of which is connected through a power stage 18 to a coil and distributor 19. The coil and distributor 19 is connected to the four spark ignition plugs 20 and causes ignition sparks to occur in these plugs at appropriate moments.

The output of transducer 16 is also connected to an injection control device 22, the output of which is connected through a power stage 23 to fuel injectors 24.

The output of position transducer 16 is also connected to an engine speed calculation device 26, the output of which is supplied as a further input to dwell control device 17.

Engine 10 is also provided with a transducer 27, which may be a Hall effect transducer, and produces a single pulse of fixed duration for each revolution of the engine camshaft. The output of transducer 27 and also the output of position transducer 16 are supplied to a cylinder synchronization device 28. Cylinder synchronization device 28 produces an output that indicates which cylinder is undergoing the combustion stroke.

There is also provided a transducer 29, which produces 7000 pulses for each mile traveled by the vehicle. The output of this transducer is supplied to a gear ratio calculation device 30, which also receives the output signal from position transducer 16. Device 30 provides an output indicative of the gear presently engaged.

Engine 10 is also provided with a load demand transducer 32 which measures the load demand of the engine. In the present example, transducer 32 measures the absolute pressure of the manifold of the engine. The load demand could also be detected by measuring other quantities such as throttle valve opening position.

The output of position transducer 16 is further supplied to a fire period calculation device 33 which calculates each fire period. The actual period calculated as the fire period is a period which elapses between pistons in consecutive cylinders being at 30° after top dead center.

The system also includes a memory 35 in which is stored a two dimensional array of spark advance angles. The abscissa and ordinate of the array correspond to engine speed and load demand. Memory 35, speed calculation device 26, and load transducer 32 are connected to a calculation device 36. For each prevailing engine speed and load demand, calculation device 36 calculates a basic value for the spark advance angle and supplies this to one input of a summer 37. Calculation device 36 calculates its basic value form the spark advance values stores in the array in memory 35 at the four points in the speed/load plane surrounding the prevailing engine speed and load demand. Each of these values is multiplied by an appropriate weighting factor and the four resulting values are added to provide the basic value for the spark advance angle. Thus, the calculation device 36 calculates the spark advance angle by interpolation. This interpolation technique is also described in U.S. application Ser. No. 888,067 filed July 22, 1986, incorporated herein by reference.

The spark advance angles are stored in memory 35 at a density sufficient to provide a reasonably accurate value in view of the irregularities of the true optimum spark advance angle characteristics of the engine. The spark advance values in memory 35 take the form of a fixed look-up table which has been established from rig-tests of sample engines of the same type as engine 10. The true optimum spark advance values will differ both between individual cylinders of the same engine and between individual engines, for reasons outlined above, from those stored in memory 35.

The system also includes a memory 40 in which is stored a two dimensional array of air/fuel ratios. The abscissa and ordinate of the array correspond to the engine speed and load demand. Memory 40, speed calculation device 26, and load transducer 32 are connected to a calculation device 41. For each prevailing engine speed and load demand, device 41 calculates a basic value for air/fuel ratio and supplies this to a further calculation device 42. Calculation device 41 calculates the basic value from air/fuel ratio values stored in the array in memory 40 by the interpolation method discussed previously with respect to calculation device 36. The air/fuel ratio values stored in memory 40 also take the form of a fixed look-up table established from rig-tests on sample engines.

Calculation device 42 also receives the outputs from load transducer 32 and speed calculation device 26 and calculates the injector "on" time necessary to maintain the air/fuel ratio demanded by the output of calculation device 41.

The output of calculation device 42 is supplied to injector control device 22 as a command value for injector "on" time. Injector control device 42 uses the output of transducer 16 to ensure the fuel injectors are synchronized correctly with the operation of the cylinders of engine 10.

As will shortly be described in detail, the system imposes small advanced and retarded perturbations on the spark advance angle for each cylinder in turn and senses a change in engine output speed caused by these perturbations. An individual correction memory 45a to 45d is provided for each individual cylinder. As the spark advance values for each cylinder in turn are perturbed, the associated change in engine speed is used to derive correction values to the command spark advance values and these corrections are stored in the respective correction memories 45a to 45d. In each of memories 45a to 45d, the correction values are stored as a two dimensional array in which the abscissa and ordinate represent engine speed and load demand, and these values are stored with the same density as the value stored in memory 35.

Memories 45a to 45d are connected through a selector device 46 to a calculation device 47, with selector device 46 receiving the output signal from cylinder synchronization device 28 and calculation device 47 receiving the outputs from load transducer 32 and speed calculation device 26. For the prevailing engine speed and load demand, calculation device 47 calculates a correction value to the spark advance angle for the cylinder which is about to fire and supplies its value to a second input of summer 37. Calculation device 47 calculates each correction value from the value stored in the appropriate one of memories 45a to 45d by using the same interpolation method as described above with reference to calculation device 41.

The output of summer 37 is supplied to an input of a further summer 48.

The perturbations to the spark advance angle are determined in a perturbation generator 50. Perturbation generator 50 has inputs from gear ratio calculation device 30 and fire period calculation device 33 and uses these inputs to determine the frequency of the perturbations to the spark advance angle. Perturbation generator 30 also receives an input from cylinder synchronization device 28 and uses this input to synchronize the perturbations with the cylinder whose spark advance angle is to be perturbed. The perturbation output of generator 50 is supplied to a second input of summer 48. The output of summer 48 is supplied to dwell control device 17 and represents a commanded value for spark advance angle. Dwell device 17 uses the output of speed calculation device 26 and position transducer 16 to ensure that ignition sparks occur at the commanded spark advance angle values.

Perturbation generator 50 also provides an output to a slope detector 51 which calculates the slope of engine output speed with respect to spark advance angle for the cylinder whose spark advance angle is being perturbed. Slope detector 51 and the manner in which the slope is used to update memories 45a to 45d are described below but, befoe doing this, the perturbation frequency produced by perturbation generator 50 will be discussed.

Because combustion occurs intermittently in engine 10, the torque output of engine 10 fluctuates during each ignition cycle. In order to smooth these fluctuations, flywheel 11 is provided and it converts these fluctuations in torque into small accelerations and decelerations. The resilient nature of shafts 12 and 14 prevent the small accelerations and decelerations from causing changes in the speed of drive wheels 15.

Flywheel 11, shafts 12 and 14, and gearbox 13 form a resonant system. The resonant frequency varies with both the gear ratio established in gearbox 13 and the load. In a test vehicle, the system was found to have a resonant frequency of 4 Hz in second gear and 9 Hz in fourth gear.

Every single perturbation in the spark advance angle causes a change in the output torque produced by engine 10. In view of the resonant nature of flywheel 11 and shafts 12 and 14, the resulting change in speed of flywheel 11 has two components. The first of these components is a damped ringing response at the appropriate resonant frequency, and, in the test vehicle, the ringing response decays with a time constant of 0.3 seconds. The second component is a longer term response which is associated with a smooth non-ringing transition to the new steady state which arises when the change in the resistance forces caused by the change in the vehicle speed matches the change in torque from the engine. With a test vehicle, the second component has a time constant of 7 seconds in fourth gear.

In order to measure the slope of engine output with respect to spark advance angle as quickly as possible, the first component of the response should be used to calculate the slope.

Figure 3:
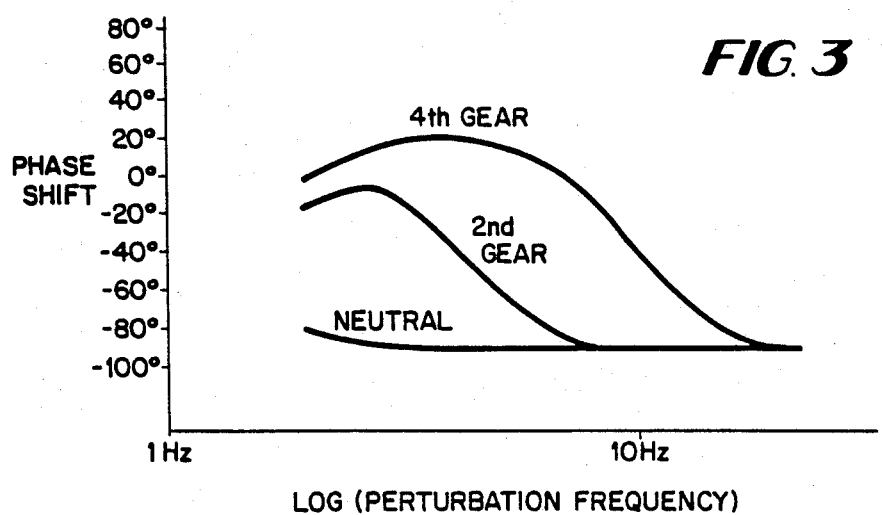
FIG. 3 is a graph illustrating the phase lag between a perturbation waveform and the resulting change in engine speed as a function of perturbation frequency.

In FIG. 3, there is shown a graph of the phase shift between a perturbation waveform generated by generator 50 and the resulting change in engine speed as a function of perturbation frequencies for fourth gear, second gear and neutral. In neutral, or when the clutch is disengaged, the phase shift is approximately 90° with the system exhibiting a first order response. When in gear, the speed response approaches that of a second order resonant system, with the resonant frequency being dependent upon both the gear ratio and the load. When in gear, the response shown in FIG. 3 is the first part of a response mentioned above. As can be seen, the phase shift changes rapidly in the region of the resonant frequency. At frequencies well above the resonant frequency, the phase shift approaches 90° and this is the same as for neutral.

In order to provide the same result in all gears and in neutral, it is preferred, where possible, that the perturbation frequency produced by generator 50 is greater than the highest resonant frequency of the resonant system formed from flywheel 11, shafts 12 and 14, and gearbox 13. In the case of the test vehicle, this means that the perturbation frequency needs to be at least 10 Hz.

There is a further constraint on the perturbation frequency produced by perturbation generator 50. Perturbation in the spark advance angle can only take effect when ignition is initiated in the cylinder whose spark advance angle is to be perturbed. In the case of the four cylinder engine of the present example, this occurs once for each two revolutions of the crankshaft. Consequently, the perturbation frequency cannot take a fixed value and the maximum perturbation frequency is restricted by the speed of the engine. With the four cylinder engine of the present example, a perturbation frequency of 10 Hz can only be achieved at speeds equal to or greater than 2400 rpm. In the present example, the perturbation generator operates in a first mode in an upper speed range which commences at 2400 rpm and in a second mode for engine speeds below 2400 rpm.

In the first mode, perturbation generator 50 generates a two level waveform which only acts on the cylinder to be perturbed at a frequency which is equal to or greater than 10 Hz and which has a period equal to a whole number of fire periods of engine 10. During the first part of each period of this waveform, perturbation generator 50 sets the perturbation value so as to cause a small increase in the spark advance angle and, in the second part of each period, it sets the perturbation value so as to cause a small decrease in the spark advance angle.

Figure 4:
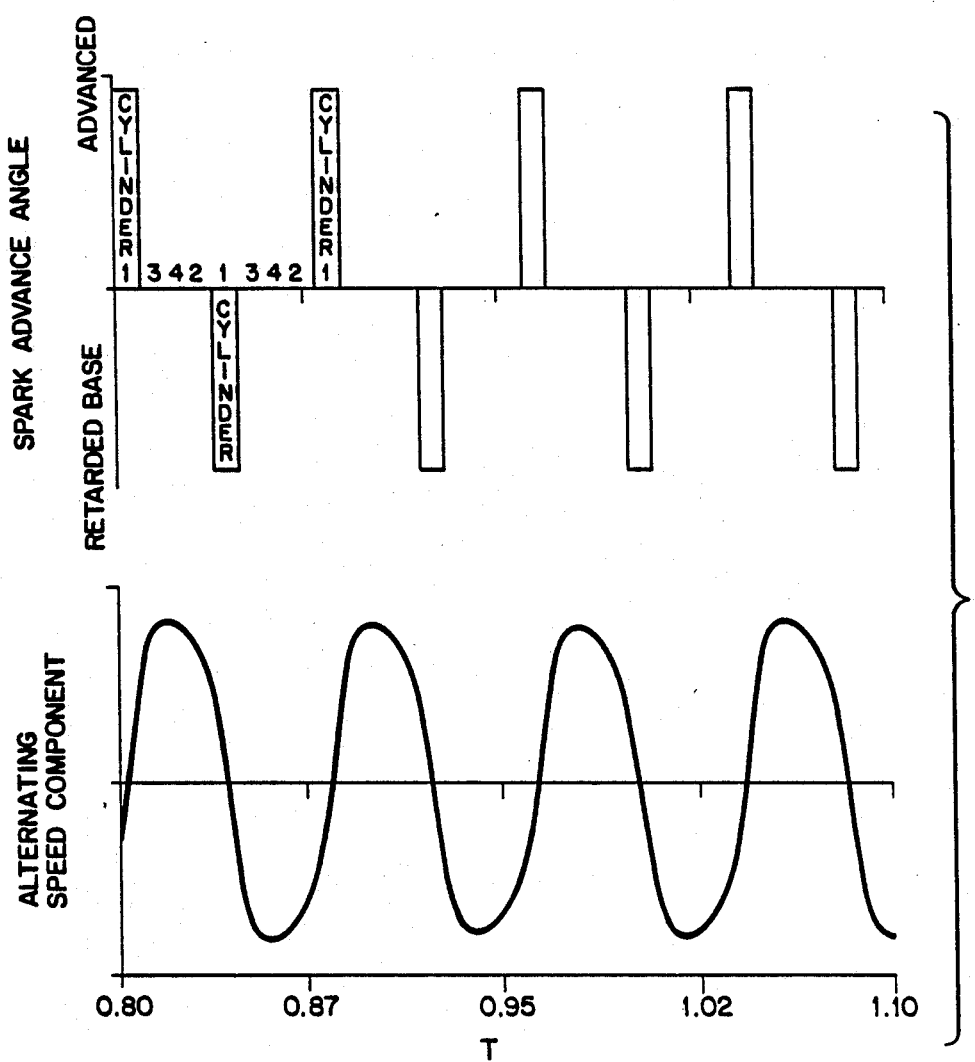
FIG. 4 is a graph showing perturbations applied to the spark advance angle at 3000 rpm and the resulting changes in engine speed.

More specifically, at engine crankshaft speeds in the range of 2400 rpm to just below 3600 rpm, the perturbation waveform contains one advanced and one retarded perturbation. Including the engine cylinders whose spark advance angles are not perturbed, each period of the perturbation waveform will contain eight engine fires. In this speed range, the perturbation frequency varies between 10 Hz at 2400 rpm and 15 Hz at just below 3600 rpm. FIG. 4 shows the perturbation waveform at 3000 rpm with cylinder 1 being optimised in this particular example and the resulting alternating component of the engine speed.

Figure 5A:
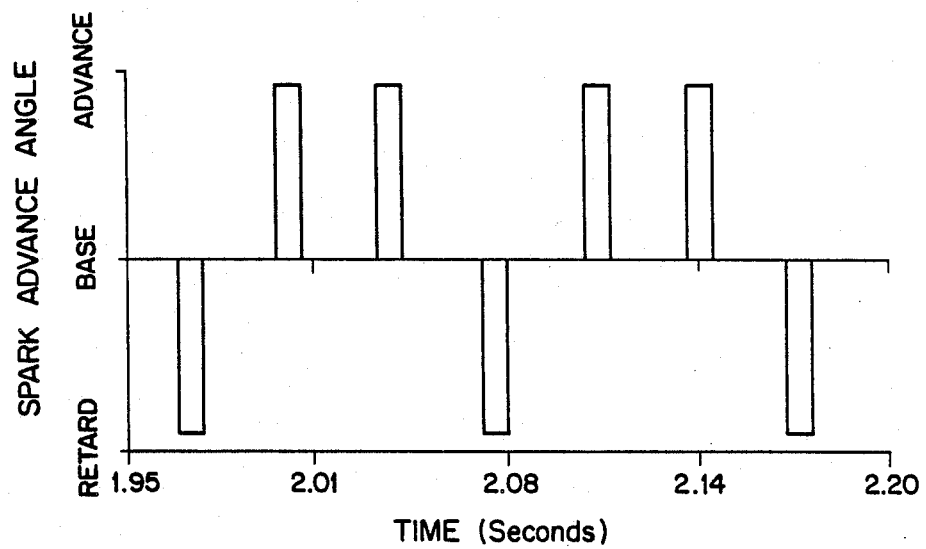
FIG. 5a is a graph showing perturbations applied to spark advance angle at 4000 rpm.

In the speed range from 3600 rpm to just below 4800 rpm, each period of the perturbation waveform contains three perturbations and a total of twelve engine fires. The perturbation frequency varies from 10 Hz at 3600 rpm to 13.33 Hz at just below 4800 rpm. An example of the perturbation waveform at 4000 rpm is shown in FIG. 5a. As may be seen, this waveform includes two advanced perturbations and one retarded perturbation for each period of the waveform. Alternatively, each period of the waveform could include one advanced perturbation and two retarded perturbations.

Figure 5B:
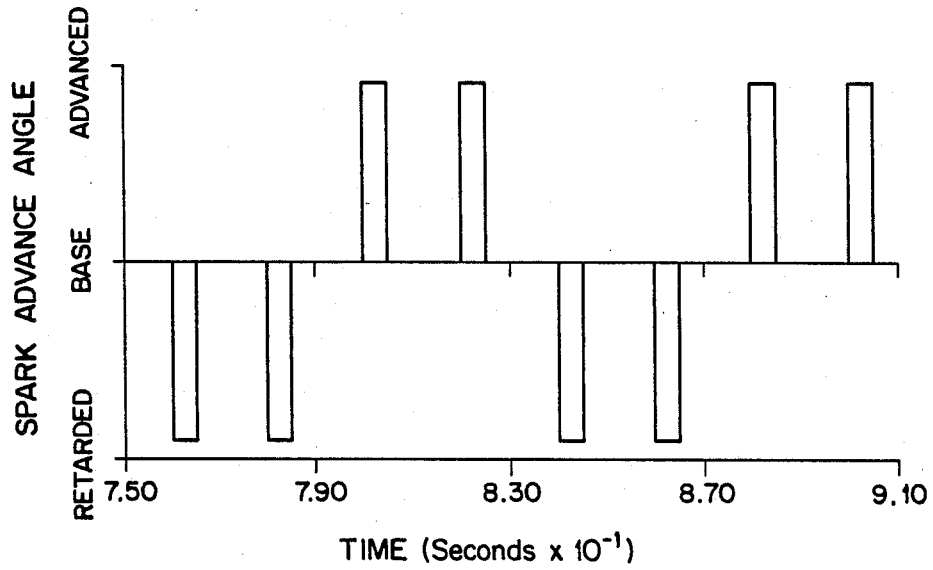
FIG. 5b is a graph showing perturbations applied to spark advance angle at 6000 rpm.

In the speed range from 4800 rpm to just below 6000 rpm, the perturbation waveform contains four perturbations and a total of sixteen fires four in each cylinder of the engine. The perturbation frequency varies between 10 Hz at 4800 rpm to 12.5 Hz at just below 6000 rpm. An example of the perturbation wave form at 6000 rpm is shown in FIG. 5b. As may be seen, the perturbation waveform includes two advanced perturbations and two retarded perturbations for each period.

In this first mode, perturbation generator 50 operates in the same manner in all gears and in neutral and so does not require knowledge of which particular gear is engaged.

In the second mode, for engine speeds below 2400 rpm, it is no longer possible to maintain a minimum eight engine fires within the maximum perturbation period of 100 ms corresponding to a minimum perturbation frequency of 10 Hz. In view of the phase changes which occur in the region of the resonant frequencies, in the second mode, the perturbations are applied at frequencies well below the resonant frequencies of the various gears.

Figure 6:
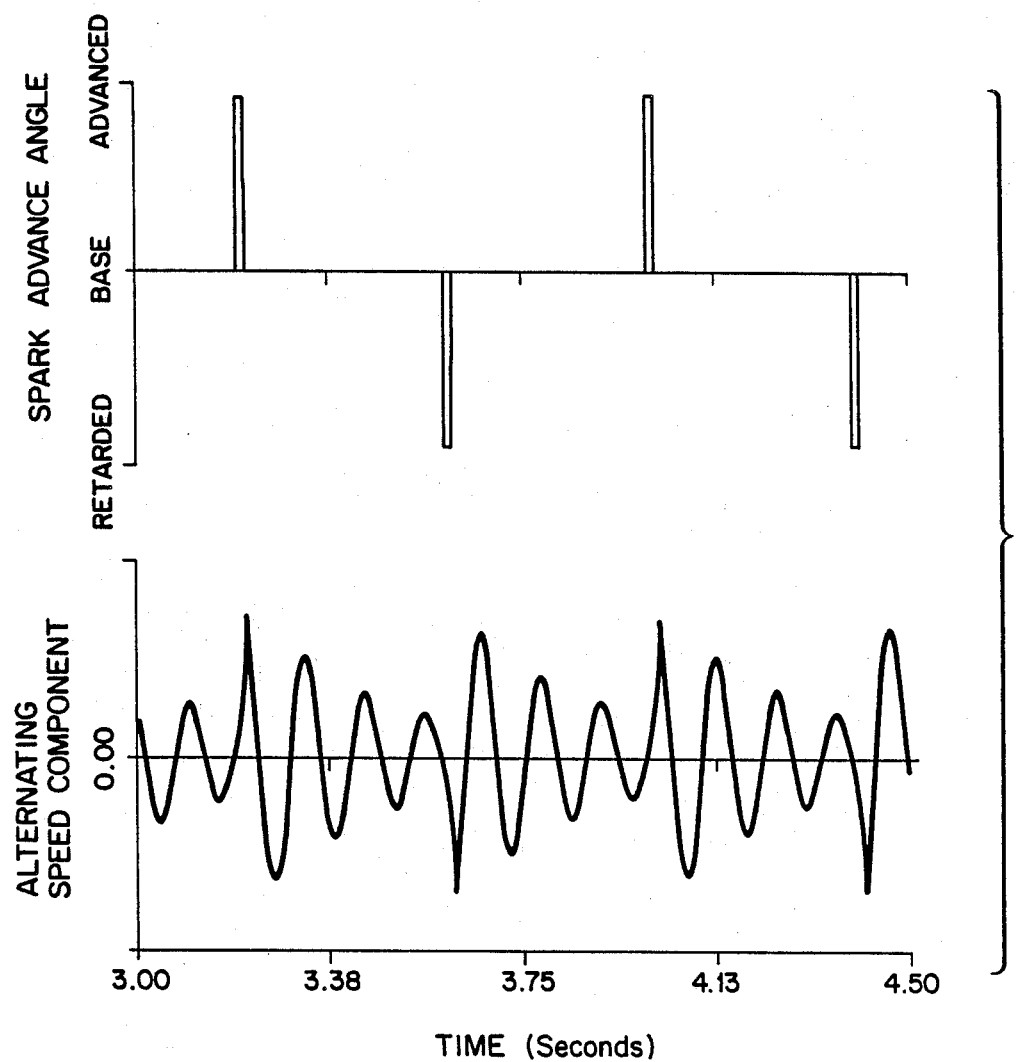
FIG. 6 is a graph showing perturbations applied to spark advance angle at 1800 rpm and the resulting changes in engine speed.

More specifically, in the second mode, an individual cylinder is perturbed with the following waveform. At the beginning of each period of the waveform, an advance perturbation is applied to this spark advance angle, the cylinder is then left unperturbed for a fixed settling time, a retarded perturbation is then applied, and finally the cylinder is left unperturbed for a further fixed settling time. The waveform is then repeated. An example of this wave form for an engine speed of 1800 rpm is shown in FIG. 6 together with the change in the alternating speed component. Thus, this waveform is approximate to that in which alternate advance and retarded impulses are applied to an individual cylinder. When in gear, the alternating component of the speed is nearly cosinusoidal in response to the above waveform, and the frequency of the speed response is approximately the frequency of the resonant system with the selected gear. The settling time is selected so as to allow adequate decaying of the engine speed fluctuations prior to the next perturbation of the spark advance angle. With the second mode, perturbation generator 50 requires knowledge of which gear, if any, is selected.

Slope detector 51 will now be described. Detector 51 includes a measurement window generator 52, an advance half cycle accumulator 53, a retarded half cycle accumulator 54, and a slope calculator 55. Measurement window generator 52 receives the perturbation waveform from perturbation generator 50 and also the outputs from cylinder synchronization device 28, gear ratio calculation device 30 and fire period calculation device 33. Accumulators 53 and 54 and slope calculator 55 receive the output from fire period calculation device 33.

Measurement window generator 52 creates a series of contiguous positive and negative measurement windows and these windows are supplied respectively to the advance and retarded half cycle accumulators 53 and 54.

When perturbation generator 50 is operating in its first mode, with the engine speed equal to or greater than 2400 rpm, each positive measurement window corresponds to the first part of a respective period of the perturbation waveform, and each negative measurement window corresponds to a second part of a respective period of the perturbation waveform. The measurement windows are shifted in phase with respect to the perturbation waveform by an amount which is a compromise of the actual phase shifts which occur in the various gears between the perturbation waveform and the engine response. In the present example, this phase shift is 10° of the perturbation waveform, not crankshaft angle.

With perturbation generator 50 operating in its second mode, measurement window generator 52 creates in series a positive measurement window, a negative measurement window, and a further positive measurement window immediately following each advanced perturbation. Following each retarded perturbation, it creates in series a negative measurement window followed by a positive measurement window and a further negative measurement window. Each measurement window has a duration equal to a whole number of quarters of the prevailing resonant period of the resonant system comprising shaft 12 and 14 and gearbox 13 for the selected gear, and in this particular example the first measurement window is one quarter whilst the second and third measurement windows are one half respectively.

Accumulators 53 and 54 are responsible for detecting the average speed changes respectively occurring during the positive and negative measurement windows. During each engine cycle, severe fluctuations in speed occur because of the nature of the combustion process occurring in the individual cylinders. In order to avoid any confusion which could be caused by these fluctuations, the engine speed is sensed by measuring the period for whole engine fires only. Specifically, engine fire periods whose central points fall in the positive and negative measurement windows are accumulated respectively in the advance and retarded half cycle accumulators 53 and 54.

The outputs of accumulators 53 and 54 are used by slope calculator 55 to calculate the slope of engine output with respect to spark advance. The actual formula for doing this will be described below. For the present, it is to be noted that the formula takes into account the change in engine speed which occurs between a positive measurement window and a negative measurement window and also the change of speed which occurs between a negative measurement window and a positive measurement window. By taking account of both changes of speed, the effects of any acceleration or deceleration of the vehicle are eliminated. Such acceleration or deceleration may be caused, for example, by movement of the accelerator by the driver or by changes in resistance forces or road gradient.

The system further includes a summer 57, a memory 58 which contains demanded values of the slope, a demand slope calculation device 59, a memory updating device 60 which calculates corrections for the value stored in memories 45a and 45d, and a selector 61 for applying these corrections to appropriate ones of these memories. Slope calculation device 59 and updating device 60 receive the outputs of engine speed calculation device 26 and load transducer 32, and selector 61 receives the output from cylinder synchronization device 28.

The output of slope calculator 55 is applied to one input of summer 57. Memory 58 contains a two dimensional array of demanded slope values, with the abscissa and ordinate of the array representing engine speed and load demand. For most values of engine speed and load demand, the demanded slope is zero and this corresponds to maximum torque output. At certain speeds and load, a non-zero value is stored in memory 58 and there are various reasons for this. For example, in some engines under high load, the spark advance angle which causes maximum output may permit knocking to occur, and under some conditions the maximum torque output may be associated with undesirable exhaust emissions. For the prevailing engine speed and load, slope calculation device 59 calculates the demanded slope value from the value stored in memory 58 by using the interpolation method described above with reference to calculation device 36. This demanded slope value is supplied to a negative input of summer 57. The output of summer 57 represents the error between the actual slope and the demanded slope and this error is supplied to updating device 60. For each error value received from summer 57, updating device 60 updates the values stored in an appropriate one of memories 45a to 45d for each of the four array points surrounding the prevailing engine speed and load demand. Specifically, for each array point, a new correction is calculated and stored form the old correction in accordance with the following formula:

new correction=old correction+$k_1$. (weighting factor)·(error)

This formula corrects the value in the appropriate memory from the error by integration and thus smooths out the noise component in the slope measurements. The constant $k_1$ should be chosen so as to be small enough to reduce these noise components to a low level but large enough to provide rapid convergence to the optimum spark advance angle. The weighting factor given in this formula is the same as the weighting factor used by calculation device 36.

As the density of array points in memory 35 is chosen to give a good match with the optimum spark advance characteristics, the information in the slope measurements will represent a mismatch which has occurred between the actual optimum characteristics and those stored in memory 35. It is therefore reasonable to update memories 45a to 45d by a process which is symmetrical with the interpolation process used to derive the basic spark advance angle. The formula given above achieves this. Furthermore, in this formula the values stored in memories 45a to 45d are corrected in proportion to the magnitude of each error value, and so maximum advantage is taken of the information present in each slope measurement.

Figure 7:
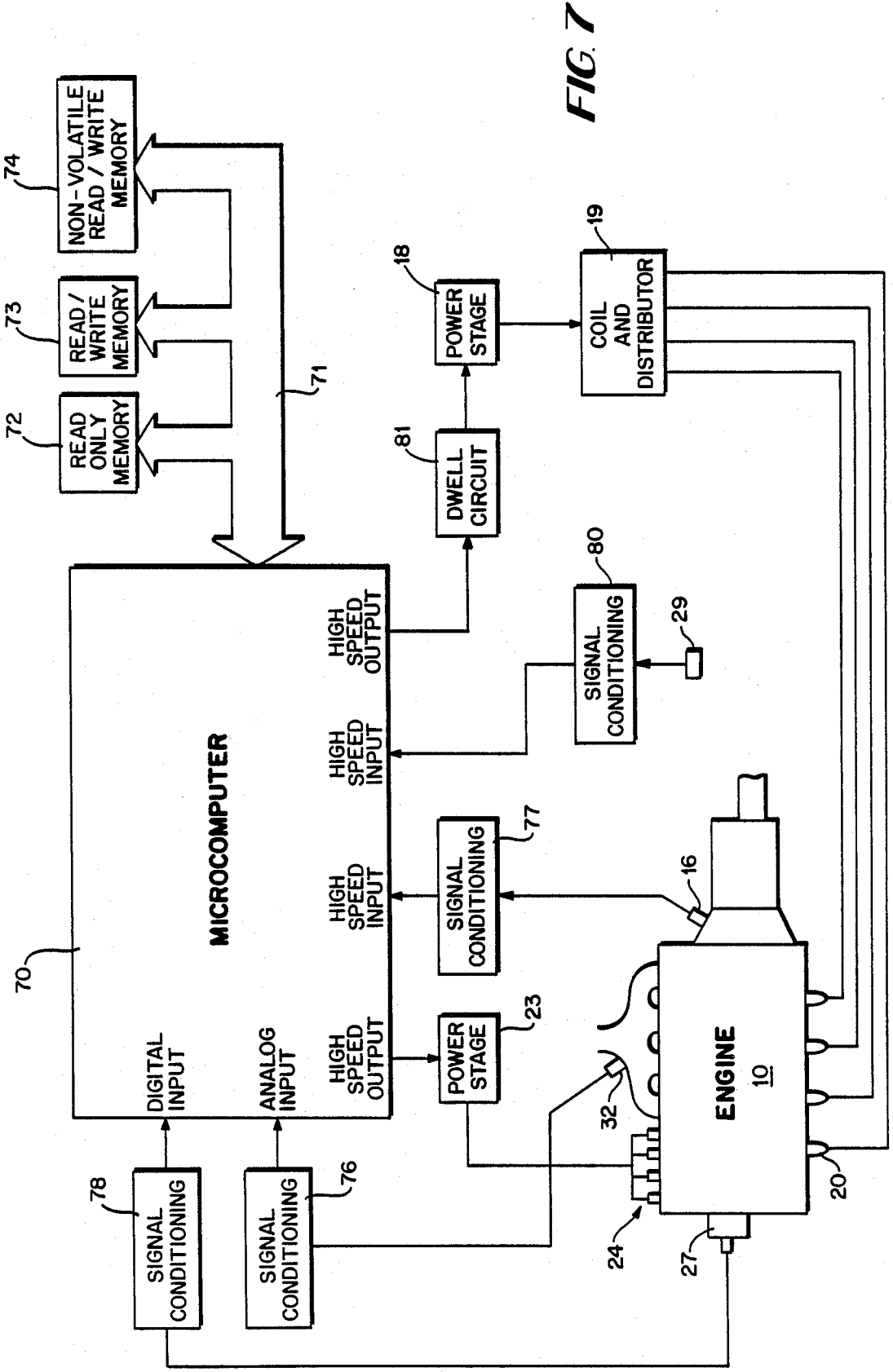
FIG. 7 is a block diagram of a microcomputer system which implements the functional components of FIG. 1.

The functional blocks shown in FIG. 1 are implemented by a microcomputer system, and this system will now be described with reference to FIG. 7.

The microcomputer system includes an Intel Corporation 8097 microcomputer 70 which is connected via a data and address bus 71 to an Intel type 27C64 read only memory 72, a Hitachi type 6116 read/write memory 73 and a Greenwich Instruments type NVR 2 non-volatile read/write memory 74 (available from Greenwich Instruments Ltd., Sidcup, Kent, England). The program and lookup tables are stored in memory 72, temporary variables are stored in memory 73 and corrections to the spark advance angle are stored in memory 74.

The microcomputer system implements engine speed calculation device 26, fire period calculation device 33, gear ratio calculation device 30, cylinder synchronization device 28, perturbation generator 50, measurement window generator 52, accumulators 53 and 54, selectors 46 and 61, slope calculation device 55, updating device 60, memories 35, 40, 45a to 45d, 58, calculation devices 36, 41, 47 and 59, summers 37, 48 and 57, part of dwell control device 17, and injector control device 22.

Load transducer 32 is connected through a signal conditioning circuit 76 to an analog input at microcomputer 70. Position transducer 16 is connected through a signal conditioning circuit 77 to a high speed input of microcomputer 70. Transducer 27 is connected through a signal conditioning circuit 78 to a digital input of microcomputer 70. Transducer 29 is a rotating magnet that operates a reed relay to produce the 7000 pulses per mile, and this transducer is connected through a signal conditioning circuit 80 to a high speed input of microcomputer 70. The two high speed inputs described above are both capable of interrupting microcomputer 70. A high speed output of microcomputer 70 is connected to the input of a dwell control circuit 81 which, together with part of the program stored in memory 72, performs the function of dwell control device 17 of FIG. 1. Dwell control circuit 81 is a type L497 dwell control circuit (supplied by S. G. S. Limited of Phoenix, Arizona U.S.A.). Dwell control circuit 81 initiates the build-up of current in the primary winding of the ignition coil at the correct moment to achieve the required level just before the current is interrupted. Dwell control circuit 81 also limits the coil current to the required level during the short period which elapses between achieving the required current and the current being interrupted. The output of dwell control circuit 81 is connected to power stage 18 which, as mentioned with reference to FIG. 1, is connected to the input of the coil and distributor 19.

Another high speed output of microcomputer 70 is connected to a power stage 23 which is connected to the inputs of injectors 24.

The program which controls microcomputer 70 will now be described.

Figure 8:
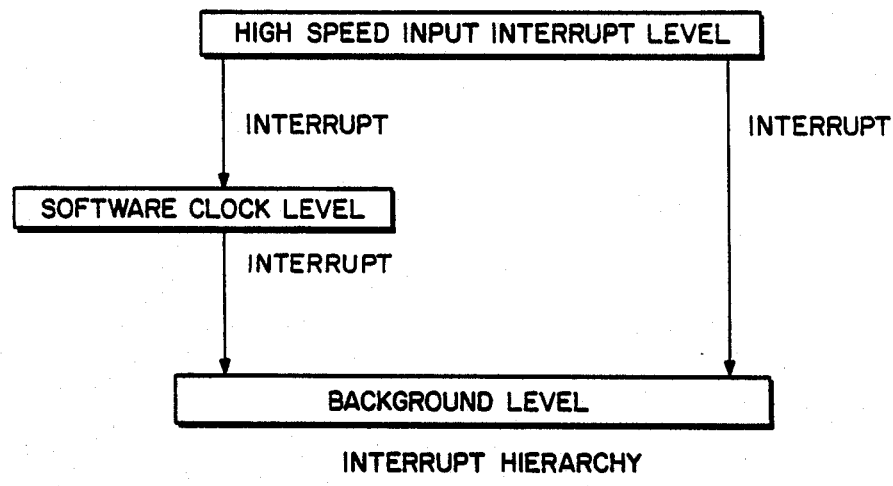
FIG. 8 is a block diagram showing the hierarchy of the computer program used in the computer system of FIG. 7.

Within the program, there are three levels of interrupt hierarchy as shown in FIG. 8. There is a background level which can be interrupted by the two other interrupt levels. The background level is responsible for the perturbations, measuring the slope of engine output with respect to spark advance angle, and using the slope measurements to update the memories, looking-up the spark advance and air fuel ratio base values, and looking-up the corrections for the spark advance angle. The background level is executed once for each engine fire.

The next interrupt level is a software clock interrupt level which is executed each 2.5 ms. This level is capable of interrupting the background level but may be interrupted itself by the third interrupt level. The software interrupt level reads the analog signal from load transducer 32 each 2.5 ms and also evaluates which gear, if any, the vehicle is in.

The third and highest interrupt level is the high speed interrupt level. As stated above, transducers 16 and 29 are connected to high speed inputs of microcomputer 70 and the rising edge of each pulse from either of these transducers generates an interrupt which causes entry to the high speed interrupt level. The high speed interrupt level is responsible for driving the fuel injectors and the coil and distributor, detecting the positions of the flywheel where teeth are missing, and evaluating the ratio between the interrupts caused by transducer 16, which are proportional to engine speed, and the interrupts caused by transducer 29, which are proportional to road speed.

Figure 9:
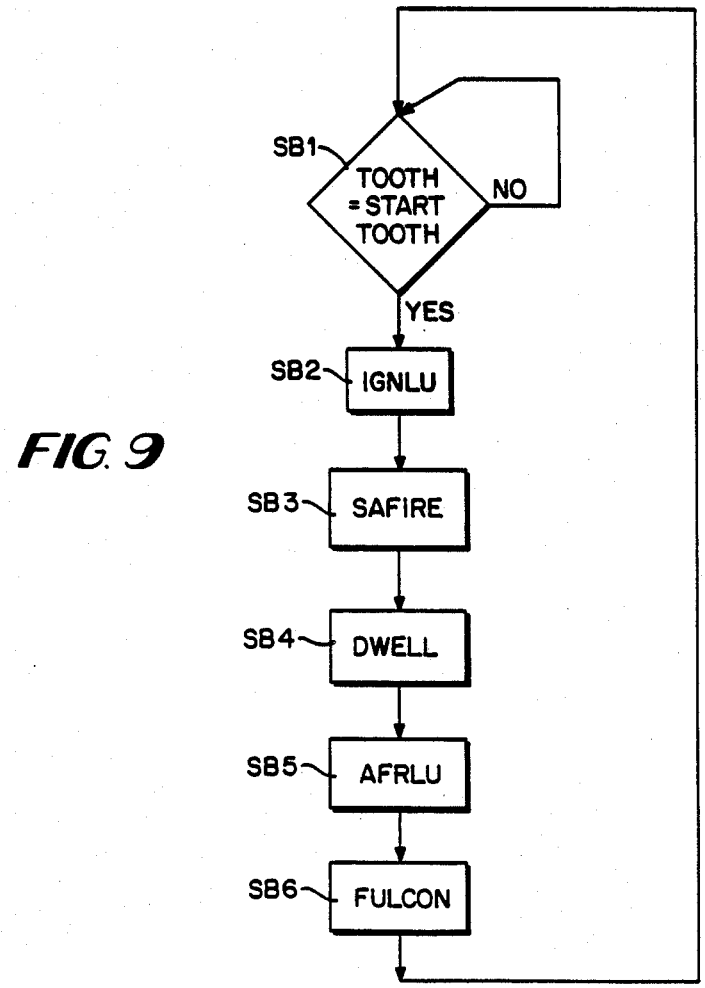
Figure 14:
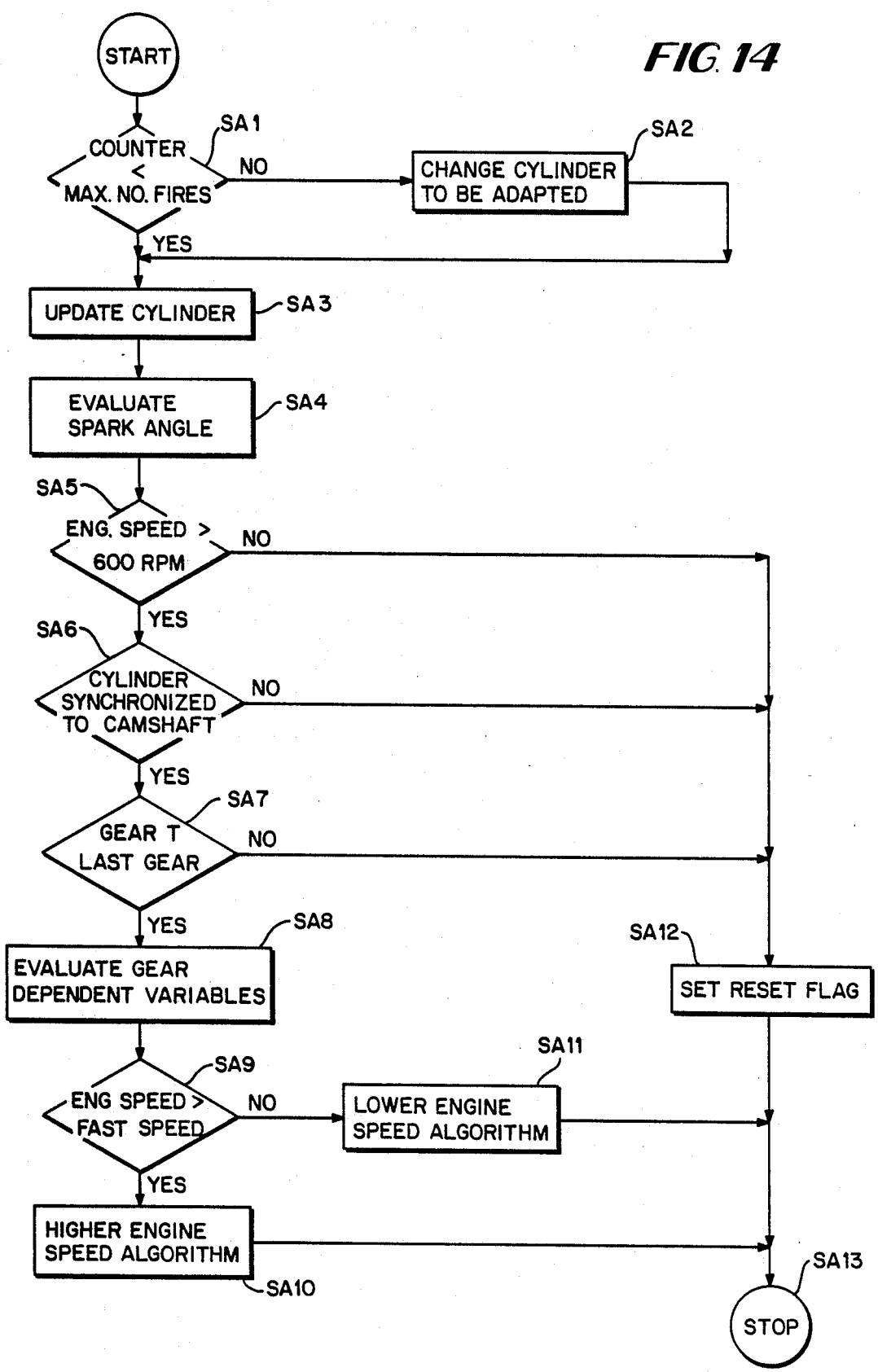
FIGS. 14 and 15 are flow charts of further parts of the program.

FIGS. 9, 10 and 11 are flow charts showing the individual modules in the three interrupt levels, and FIG. 14 shows the data flow between the modules. These figures will now be described.

FIG. 9 is the flow chart for the background level. This level includes a step SB1 in which as variable TOOTH representing crankshaft position is compared with a constant START TOOTH. This constant is selected to correspond to a position of the crankshaft which allows the other modules of the background level to be executed before the occurrence of the next spark. When equality is found in step SB1, modules IGNLU, SAFIRE, DWELL, AFRLU, FULCON are sequentially executed in steps SB2 and SB6.

The module IGNLU receives variables MAN PRESS and CYL PERIOD representing respectively the manifold pressure and the fire period. The module IGNLU uses the variable CYL PERIOD to generate a variable ENG SPEED which represents the engine speed.

Figure 12:
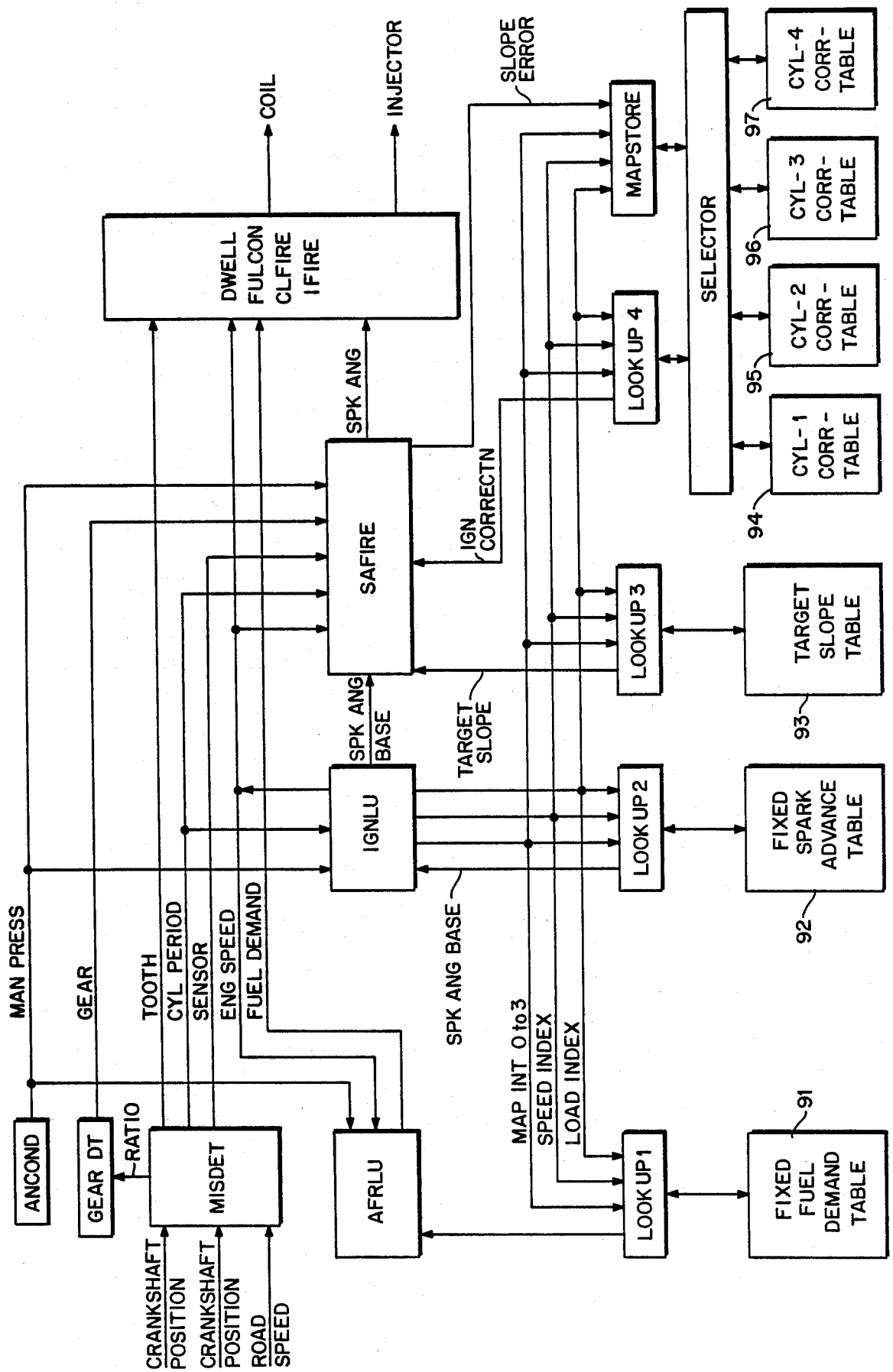
FIG. 12 is a diagram illustrating data flow between various modules of the program.

As mentioned above, memories 72 and 74 contain look-up tables corresponding to the various memories shown in FIG. 1. In FIG. 12, these look-up tables are indicated by reference numerals 91 to 97, and these look-up tables correspond respectively to memories 40, 35, 58, and 45a to 45d. In each look-up table, values are stored at a 16×16 array. In each array the abscissa and ordinate correspond respectively to engine speed and load demand, and the abscissa and ordinate are divided into sixteen discrete engine speed and load demand values.

In order to address tables 91 to 97, the module IGNLU generates address variables SPEED INDEX and LOAD INDEX corresponding respectively to engine speed and load demand. Each of these address variables can assume any one of values 0 to 15 corresponding to the lower 16 discrete engine speed and load demand values. These variables are set to the value corresponding to the engine speed and load demand immediately below the prevailing speed and load demand.

The module IGNLU also calculates four variable MAP INT 0 to 3 which represent the four weighting factors described above. The four variable MAP INT 0 to 3 correspond respectively to the four addresses (SPEED INDEX, LOAD INDEX), (SPEED INDEX+1, LOAD INDEX), (SPEED INDEX, LOAD INDEX+1), (SPEED INDEX+1, LOAD INDEX+1).

The method of calculating the weighting factors MAP INT 0 to 3 for the prevailing speed and load is shown in FIG. 13. A main rectangle is formed in the speed/load plane, the corners of the rectangle lying at addresses (SPEED INDEX, LOAD INDEX), (SPEED INDEX+1, LOAD INDEX), (SPEED INDEX, LOAD INDEX+1), (SPEED INDEX+1, LOAD INDEX+1). The main rectangle is divided into four sub-rectangles by drawing the abscissa and ordinate passing through the prevailing speed and load demand, these subrectangles having areas A0, A1, A2, A3. The weighting factor for each of the four array points is calculated by dividing the area of the sub-rectangle diagonally opposite the array point by the area of the main rectangle. Thus, the weighting factors MAP INT 0 to 3 have the following values:

MAP INT 0=A0/A

MAP INT 1=A1/A

MAP INT 2=A2/A

MAP INT 3=A3/A where A=A0+A1+A2+A3.

As shown in FIG. 12, the variables SPEED INDEX, LOAD INDEX and MAP INT 0 to 3 are supplied to a set of sub-modules LOOK UP 1 to LOOK UP 4.

The module INGLU calls the sub-module LOOK UP 2 which calculates the basic spark advance angle as a variable SPK ANG BASE by the interpolation process described above. This variable is supplied to the module SAFIRE.

Returning back to FIG. 9, the module SAFIRE calculates the perturbations, the corrections to the spark advance angle, and up-dates the look-up tables 94 to 97 in which the correction values are stored. The module SAFIRE will be described in detail below.

The module AFLRU calls the sub-module LOOP UP 1 which evaluates a variable FUEL DEMAND representing the fuel injector pulse on time.

The module DWELL determines the crankshaft positions corresponding to the ignition coil turn on and turn off times.

The module FULCON determines the crankshaft positions corresponding to turn on and turn off times of the fuel injectors.

Referring now to FIG. 10, there is shown the flow chart for the software interrupt level. This module includes a main module TIMCNT which sequentially calls modules ANCOND and GEARDT. The module TIMCNT is executed every 1.5 ms. The module ANCOND is responsible for reading the analog signal form the load transducer and generating the variable MAN PRESS. The module GEARDT determines which gear, if any, is currently engaged.

FIG. 11 shows the flow chart for the high speed interrupt level. After entering this module, in a step SH1 a check is made to determine whether the interrupt has been generated by the crankshaft position transducer or the road speed transducer. If the interrupt has been generated by the road speed transducer, in a step SH5 a module RDINT is called before making a return. The function of RDINT is to output a variable equal to the ratio of the time intervals between the interrupts caused by the crankshaft position transducer and the road speed transducer. If the interrupt is generated by the crankshaft position transducer, in a set of steps SH2 to SH4 modules CLFIRE, IFIRE and MISDET are called.

The module CLFIRE generates a variable COIL which causes the high speed output connected to dwell circuit 81 to go high and low, thereby causing the ignition coil to be turned on and off at the crankshaft angles determined by the module DWELL. The module IFIRE generates a variable INJECTOR which causes the high speed output connected to power stage 23 to go high and low so as to turn the fuel injectors on and off at the crankshaft angles determined by FULCON.

The module MISDET generates the variable TOOTH representing crankshaft position. In order to do this, the period between successive pulses from the crankshaft position transducer are measured and the two positions at which teeth are missing are also detected. Upon detecting one of these positions, the variable TOOTH is reset to zero and the value of the digital input corresponding to camshaft transducer 27 (FIG. 1) is checked. This digital input should be high upon detecting the crankshaft position at which a tooth is missing and which corresponds to the top dead center position of cylinder 1. The value of this digital input is placed in the variable SENSOR. MISDET also accumulates the time that has occurred since 30° after the top dead center position in the most recent cylinder to fire. Each time a piston reaches the 30° after top dead center position, the module MISDET places the elapsed time since the last occurrence of 30° after top dead center into the variable CYL PERIOD. This variable represents the fire period.

The module SAFIRE will now be described in more detail with reference to FIGS. 14 and 21.

The module SAFIRE is executed once for each fire and generates the perturbation waveform, evaluates the slope of engine output with respect to spark advance angle, compares this measured slope with the target slope to determine the slope error, uses the slope error to update the look-up tables containing the corrections of the spark advance angle, and evaluates each actual spark advance angle as the sum of the basic spark advance angle, the perturbation and the correction to the spark advance angle. The actual spark advance angle is passed as a variable SPK ANG to the module DWELL.

The overall flow chart for the module SAFIRE is shown in FIG. 14. Some of the individual steps are shown in greater detail in subsequent figures and these will be described in more detail after a preliminary overview of FIG. 14.

After entering the module SAFIRE, in a step SA1, it is determined whether to change the cylinder whose spark advance angles are to be perturbed. In order to do this, a check is made to see if a variable COUNTER is less than a constant MAX NO FIRES. The variable COUNTER is incremented with each engine fire and the constant MAX NO FIRES represents the number of engine fires during which the spark advance angle of each cylinder is perturbed. If step SA1 is true, a step SA2 is executed, and this step changes the cylinder whose spark advance angle is to be perturbed. In step SA2, the variable COUNTER is reset to zero, and a flag is set to suspend the evaluation of the slope until sufficient information relating to the new perturbation waveform is available.

In a step SA3, a variable CYLINDER is updated so as to indicate the next cylinder to be fired. In step SA4, the submodule LOOK UP 4 is called, and the correction to the spark advance angle is evaluated and stored as a variable IGN CORRECTN. This variable is then added to the basic spark advance angle SPK ANG BASE and stored as the variable SPK ANG.

Step SA5 checks whether the engine speed ENG SPEED is greater than 600 rpm. In this example, correction values are not calculated at engine speeds below 600 rpm. If step SA5 is true, SA6 checks whether the variable CYLINDER is synchronized to the true camshaft position. If either of steps SA5 or SA6 is false, a step SA12 is executed which sets a reset flag. As will shortly be explained, two different algorithms are used in this module, and this reset flag causes certain variables in the selected algorithm to be initialized. After completing step SA12, the module terminates.

If both steps SA5 and SA6 are true, a step SA7 is executed. This checks whether a gear change has taken place. If a gear change has taken place, step SA12 is executed. If no gear change has taken place, a step SA8 evaluates certain parameters which depend upon the gear presently engaged. In the present example, these parameters are used by the algorithm which operates at engine speeds less than 2400 rpm. These parameters comprise the resonant frequency (which is a function of the gear ratio) and the settling time which is allowed to elapse after each perturbation.

As stated with reference to FIG. 1, the perturbation waveform and the slope measurements are made in two modes. The first mode is for a higher engine speed range which starts at 2400 rpm, and the second mode is for lower engine speeds below 2400 rpm. Step SA9 checks whether the variable ENG SPEED representing engine speed is greater than a variable FAST SPEED. If step SA9 is true, a step SA10 is executed and this step performs the algorithm for generating the perturbation waveform and makes the slope measurements in the higher engine speed range. If step SA9 is false, step SA11 is executed, and this step performs the algorithm which generates the perturbation waveform and makes the slope measurement in the lower speed range. When operating in the first mode in the upper speed range, the variable FAST SPEED is set to 2430 rpm, and in the second mode in the lower speed range this variable is set to 2490 rpm. This provides sufficient hysteresis to prevent alternating between the two algorithms under what should be steady state conditions. These two algorithms will be described in detail.

Figure 15:
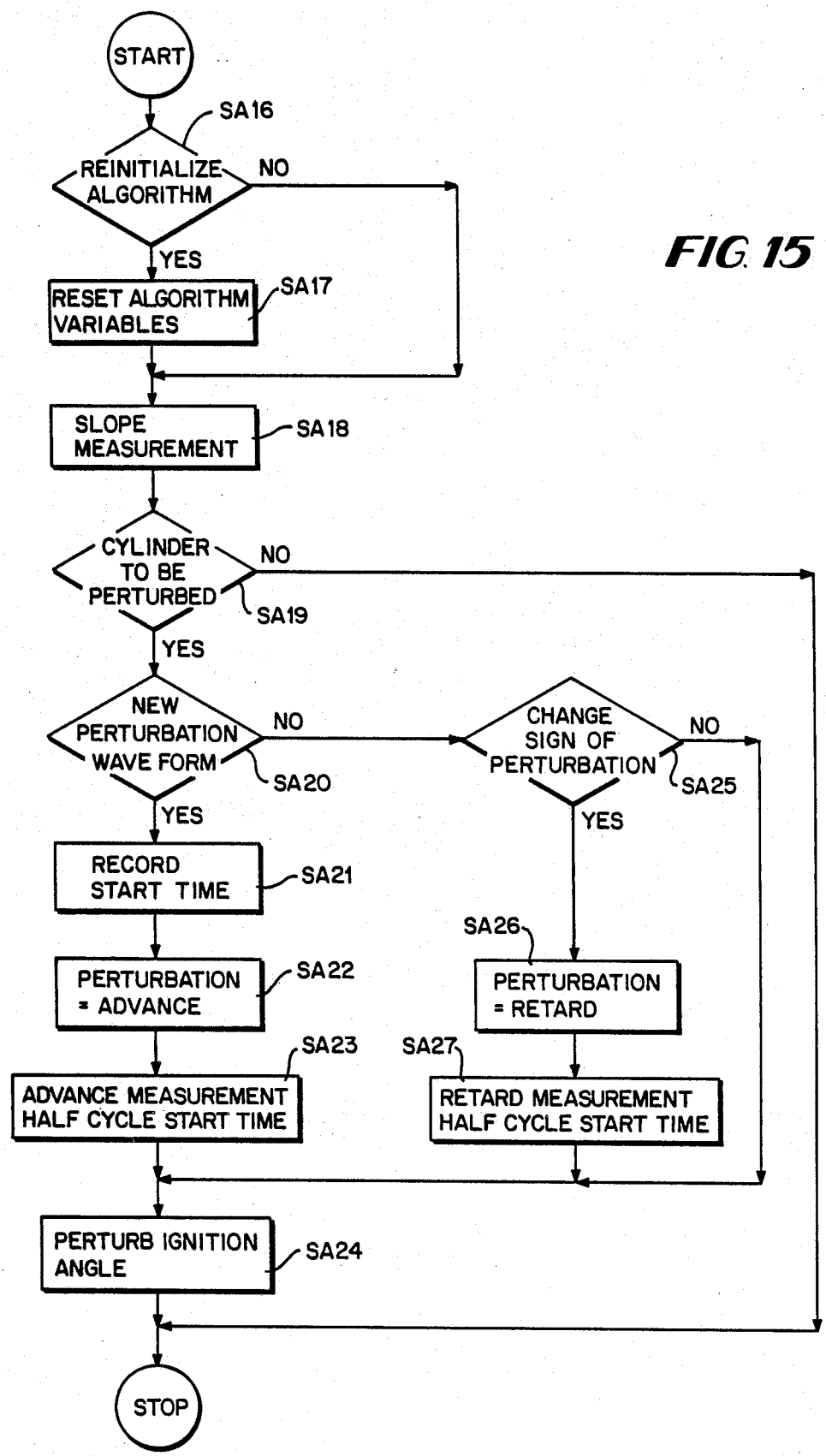

The flow chart for the higher engine speed algorithm corresponding to step SA10 is shown in FIG. 15. After entering this algorithm, step SA16 checks whether it is necessary to reinitialize the variables used by the algorithm. Reinitializing the variables allows the algorithm to start generating a new perturbation waveform while suspending evaluation of the slope until there is sufficient information available relating to the new perturbation waveform. The variables are reinitialized whenever the algorithm has been suspended because the reset flag has been set in step SA12 or because the last execution of module SAFIRE was implemented using the lower engine speed algorithm. The variables are reinitialized in step SA17.

Step SA18 measures the slope and updates the appropriate look-up table containing the correction values. Step SA18 will be described in more detail later.

Figure 16:
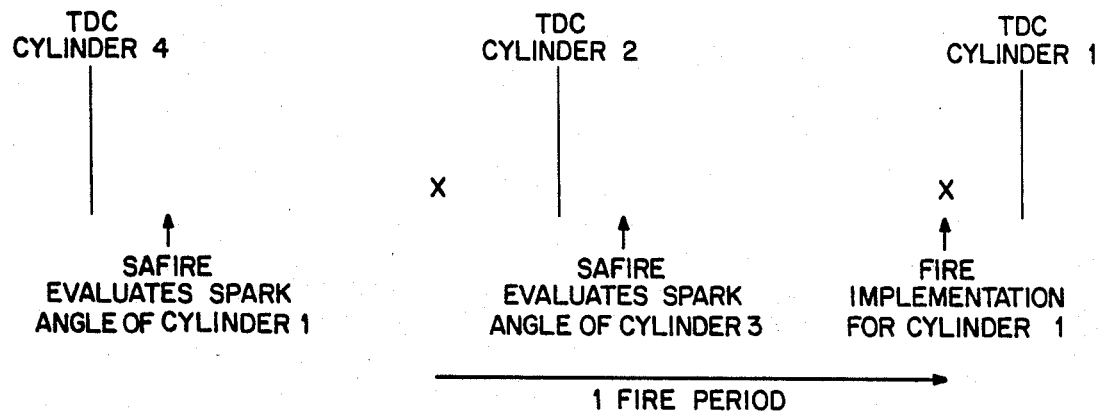
FIGS. 16 and 17 illustrate the instant of time at which parts of the program are executed in relation to the operation to the engine cylinders.

Step SA19 checks whether the cylinder that will implement the spark advance angle evaluated in this pass through the module SAFIRE is the same as the cylinder whose spark advance angle is to be perturbed. There is a one fire period delay between evaluating and implementing the spark advance angle. Consequently, step SA19 checks whether the variable CYLINDER is equal to the value associated with the cylinder immediately before the cylinder to be perturbed. It is necessary to include this one fire period delay because, at higher engine crankshaft speeds, the various modules which form the background level will not be executed before the earliest possible angle at which a spark can be commanded. This angle is 70° before the top dead center (TDC). Thus, the spark advance angle evaluated in one execution of SAFIRE as shown in FIG. 16. The module DWELL ensures that there is this delay of one fire period.

If step SA19 is false, a return is made. If step SA19 is true, the program continues with a step SA20.

Step SA20 checks whether a new cycle of the perturbation waveform should be started. The perturbation frequency is required to be equal to or greater than 10 Hz. Also, each half of the perturbation waveform should include an integral number of complete engine cycles so as to permit a perturbation to occur. Step SA20 checks whether the next spark of the cylinder to be perturbed will occur after 100 ms since the start of the current cycle of the perturbation waveform. By looking ahead in this manner, it is guaranteed that the perturbation frequency never falls below 10 Hz. If step SA20 is true and a new cycle is required, steps SA21, SA22 and SA23 are executed sequentially. Step SA21 records the time, by the software clock, at which the new cycle is to start. Step SA22 sets the flag to indicate that an advanced perturbation is required.

Figure 17:
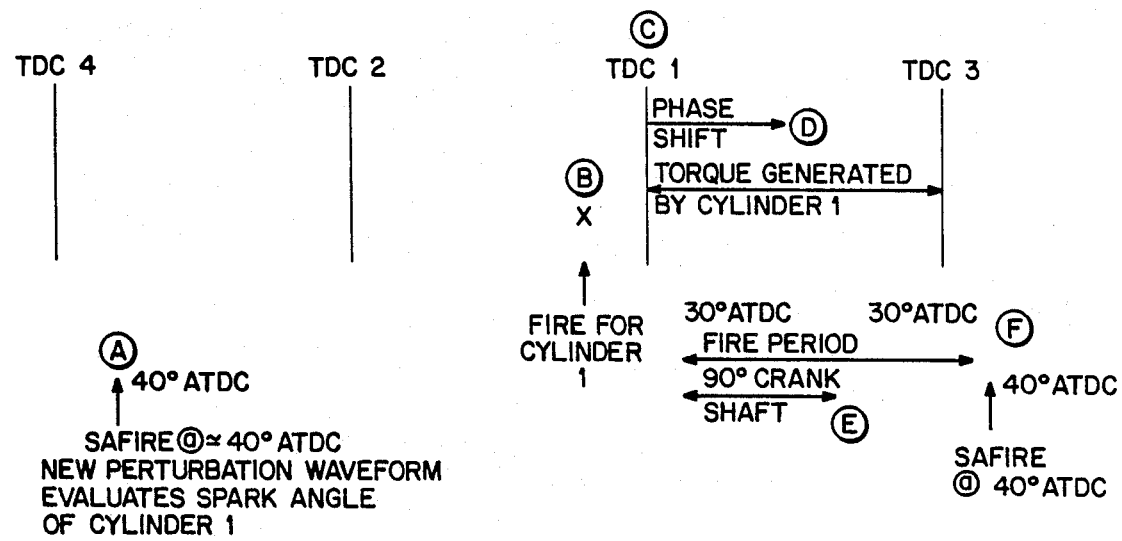

Step SA23 evaluates the commencement time of the positive measurement window corresponding to the new cycle of the perturbation waveform. As already stated with reference to FIG. 1, there is a phase shift between the perturbation waveform and the engine speed response. In view of this, a phase shift, which in the present example is 10°, is introduced between the commencement time of the positive measurement window and the beginning of the new cycle of the perturbation waveform. FIG. 17 indicates how the commencement time is derived. Consider a perturbation waveform being started at the point marked "A." This will result in an advanced perturbation being made to the spark advance angle at the point mark "B." Since a cylinder can only generate positive torque after the top dead center position, the torque resulting from the spark at point "B" starts approximately at the top dead center position indicated at point "C." If the phase shift is then added, it will be seen that the speed response will start at location "D." In the present example, where the phase shift is 10°, point "D" is still in the same cylinder. With a greater phase shift point "D" could be in a later cylinder. Thus, point "D" represents the start of the positive measurement window. (The remainder of FIG. 17 will be described later).

If step SA20 is false, then step SA35 is executed. This step checks whether the polarity of the perturbation should be changed. If step SA25 is true, steps SA26 and SA27 are executed sequentially. Step SA26 sets a flag to indicate that a retarded perturbation is required, and step SA27 evaluates the commencement time of the negative measurement window. This is performed in a similar manner to that already described for step SA23.

If both steps SA20 and SA25 are false, the same perturbation is used as was used during the previous execution of SAFIRE.

Step SA24 modifies the spark advance angle evaluated in step SA4 with the desired perturbation. A return is then made.

If the result of step SA19 is false, step SA24 is omitted as no perturbation is required.

Figure 18:
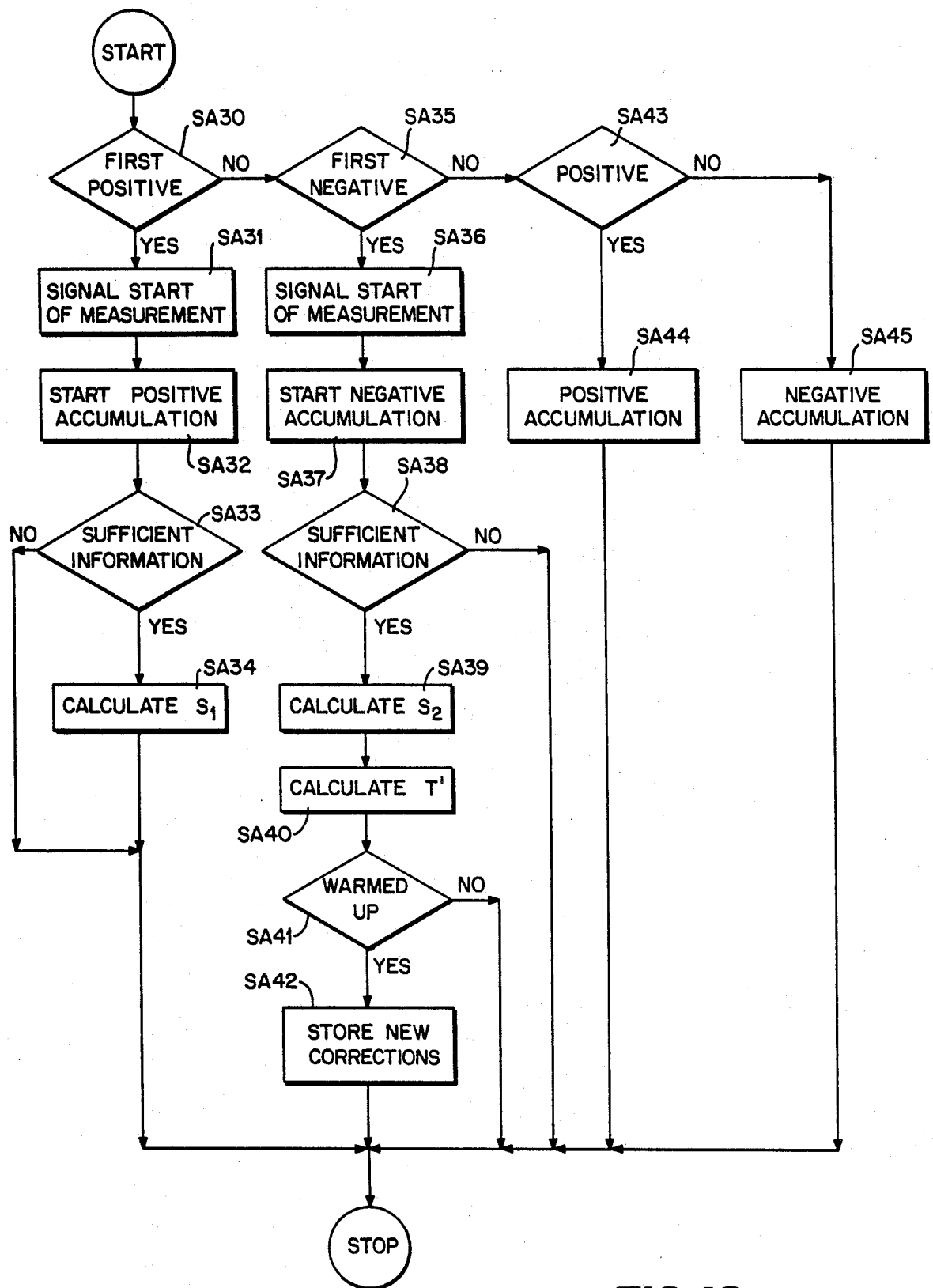
FIGS. 18 and 19 are flow charts of further parts of the program.

FIG. 18 shows the flow chart for performing the slope measurement of step SA18. As mentioned previously with reference to FIG. 1, the slope measurements are made by accumulating for each measurement window the fire periods whose central points fall within that window. Before describing FIG. 18 in detail, it will be explained why the central point of each fire period is used to associate the fire period with a particular measurement window, and then the equations which are used to calculate the slope will be described.

Clearly, some method must be used to associate each fire period with a particular measurement window. Unfortunately, the fire periods are referenced to the crankshaft position while the measurement windows are referenced to time. As can be seen from FIG. 17, the fire period corresponds to the time which elapses between 30° after top dead center (ATDC) of one cylinder and 30° ATDC of the next cylinder. As mentioned previously, the fire period is measured over 180° of crankshaft movement to filter out high frequency speed fluctuations. The module SAFIRE is not executed until at least 40° ATDC. Therefore, the value of the fire period available to it is associated primarily with the previous cylinder. Since the module SAFIRE is executed only once for each spark, and the fire period is associated with the time which elapses during 180° of crankshaft movement, it is necessary to make some approximations in deciding how to associate the fire period with a particular measurement window. In this example, it is assumed that each available fire period measurement can be associated with a time which occurs at 120° ATDC of the cylinder in which it primarily occurs. This time is indicated as point "E" in FIG. 17. This is equivalent to assuming linear changes in speed between consecutive positions which are 30° ATDC. While this may not be entirely accurate, it represents the best approximation which can be made with the limited sampling of engine speed. It is for this reason that the mid-point of each fire period is used in associating that fire period with a particular measurement window. The actual step of associating each fire period with a particular measurement window is made during the execution of SAFIRE following the particular midpoint of a fire period. Thus, for the fire period having the mid-point "E" in FIG. 17, the association is performed at point "F."

One way of evaluating the slope would be to calculate the average engine speed during each measurement window and use these results to calculate the change of engine speed occurring between measurement windows. The value for the slope could then be obtained by subtracting the change of engine speed which occurs between a negative and positive measurement window from the change of speed which occurs between a positive and negative measurement window. Each such calculation of engine speed would require a division of the number of fires occurring during the measurement window by the accumulated fire periods. Such a division requires a substantial amount of computing time. In order to avoid this decision, the slope is calculated in the following manner.

The small changes in engine speed which occur between the positive and negative measurement windows are proportional to minus the change in the average engine fire period during the two windows. Thus, an indication in change of speed could be obtained by calculating the change in the average fire period. However, the constant of proportionality increases with the square of the engine speed and so that sensitivity using this method would fall rapidly with increasing engine speed. This would result in the correction table being updated too slowly at high speeds and could result in instability at low engine speeds.

This variation in sensitivity may be avoided by multiplying the change in average fire period by the square of the engine speed. The square of the engine speed is approximately proportional to the product of the number of fires occurring in the first part and a number of fires occurring in the second part of each cycle of the perturbation waveform. Thus, the change in engine speed between a positive measurement window and a negative measurement window may be expressed as follows:

change in engine speed $= k.NA1.NR2(TA1/NA1 - TR2/NR2)$, where k is a constant, NA1 and NR2 are the number of engine fires occurring in consecutive positive and negative measurement windows, and TA1 and TR2 are the accumulated fire periods for these two windows.

This expression simplifies to:

change in engine speed $= k.(TA1.NR2 - TR2.NA1)$

In order to make a slope measurement, in the present example, (1) the engine fire periods occurring in two successive positive measurement windows are accumulated as variables TA1 and TA3; (2) the fire period occurring in the intermediate negative measurement window is accumulated as variable TR2; (3) the number of fires occurring in the two consecutive positive measurement windows are accumulated as variables NA1 and NA3; and (4) the number of fires occurring in the intermediate negative measurement window are accumulated as the variable NR2. These variables are then combined to calculate the slope T' using the following equations:

$S1 = (NA1.TR2) - (NR2.TA1)$
$S2 = (NR2.TA3) - (NA3.TR2)$
$T' = S2 - S1$

The use of three measurement windows eliminates accelerations and decelerations as described above. While the slope T' uses three measurement windows, it can be up-dated at the end of each two measurement windows. The calculation of S1 is performed at the first fire within a positive measurement window while S2 and T' are evaluated at the first fire within a negative measurement window. During the remaining fires, if any, of the positive and negative measurement windows, appropriate ones of variables NA1, NR2, NA3, TA1, TR2, TA3 are accumulated.

Referring now to FIG. 18, step SA30 checks if the fire is the first fire of a positive measurement window. If this is true, in a step SA31 a flag is set to indicate the commencement of accumulating the fires and fire periods for the positive measurement window and the actual accumulation starts in a step SA32.

Step SA33 checks if there is sufficient information to calculate S1. Providing there is sufficient information, S1 is calculated in step SA34 and a return is then made.

If step SA30 is false, in a step SA35 a check is made to see if the present fire is the first fire in a negative measurement window. If step SA35 is true, step SA36 sets a flag to start accumulating the fires and fire periods for the negative measurement window and these accumulations then start in a step SA37. Step SA38 checks if there is sufficient information to calculate S2 and T'. Steps SA33 and SA38 will be true except for the initial positive and negative measurement windows of the first cycle of the new perturbation waveform. If step SA38 is true, in steps SA39 and SA40, S2 and T' are calculated.

In the present example, the corrections to the spark advance angles are not stored until the engine temperature is greater than 80° C. In step SA41, the temperature is checked. Provided the engine temperature is warm enough, in a step SA42, the new corrections to the spark advance angle are evaluated and stored. Referring to FIG. 12, a sub-module MAPSTORE is called to do this.

If step SA35 is false, step SA43 checks if the present fire belongs to a positive measurement window. If step SA43 is true, in a step SA44 the fires and the fire periods are accumulated for the positive measurement window. If step SA43 is false, in a step SA45, the engine fires and fire periods for the negative measurement window are accumulated. After step SA44 or step SA45, a return is made.

Figure 19:
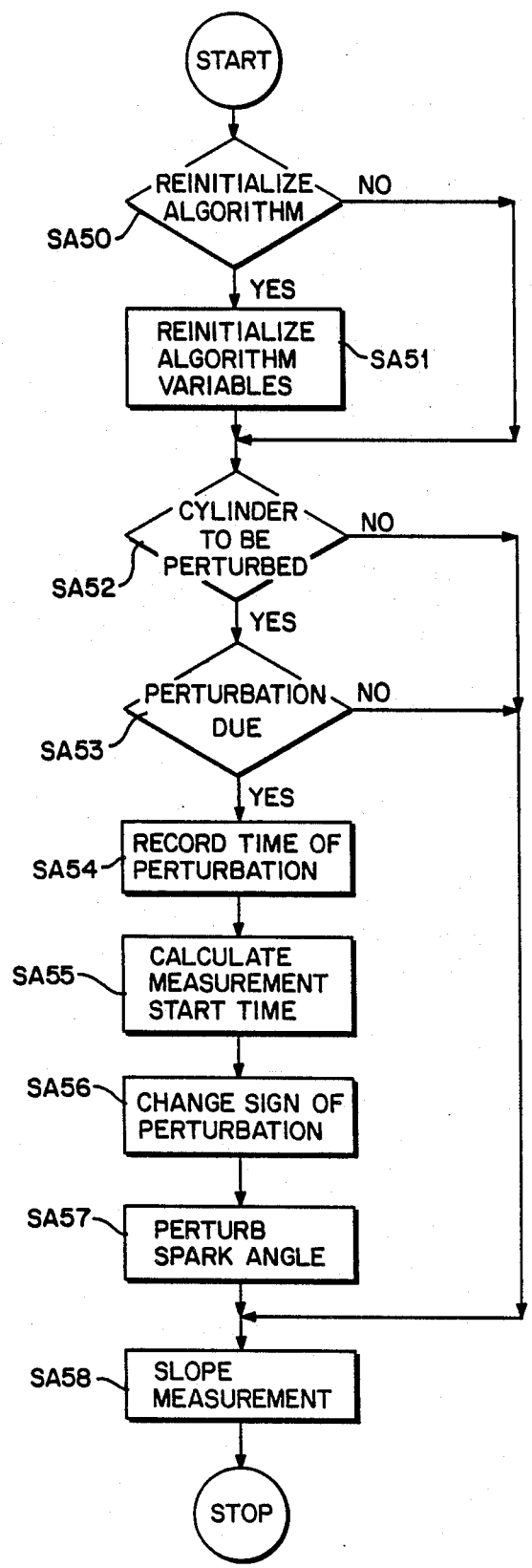

The flow chart for the algorithm for perturbing the spark advance angle and measuring the slope at lower engine speeds is shown in FIG. 19. Before describing this flow chart in detail, a general explanation of this algorithm will be given.

At the beginning of each perturbation cycle, the spark advance angle of the cylinder to be perturbed is given an advanced perturbation for a single fire. The cylinder is then left unperturbed for a fixed settling time, a retarded perturbation is then given to the cylinder for a single fire, and finally the cylinder is left for a further fixed settling time. This is shown in FIG. 6. This perturbation waveform is approximate to that in which alternate advance and retarded impulses are applied to the spark advance angle of the cylinder. When the vehicle is in gear, the speed response is approximate to that of a cosinusoid at a frequency dependent upon the selected gear and load. The settling time is selected so as to allow adequate decaying of the fluctuations in the engine speed prior to the next perturbation.

Figure 20:
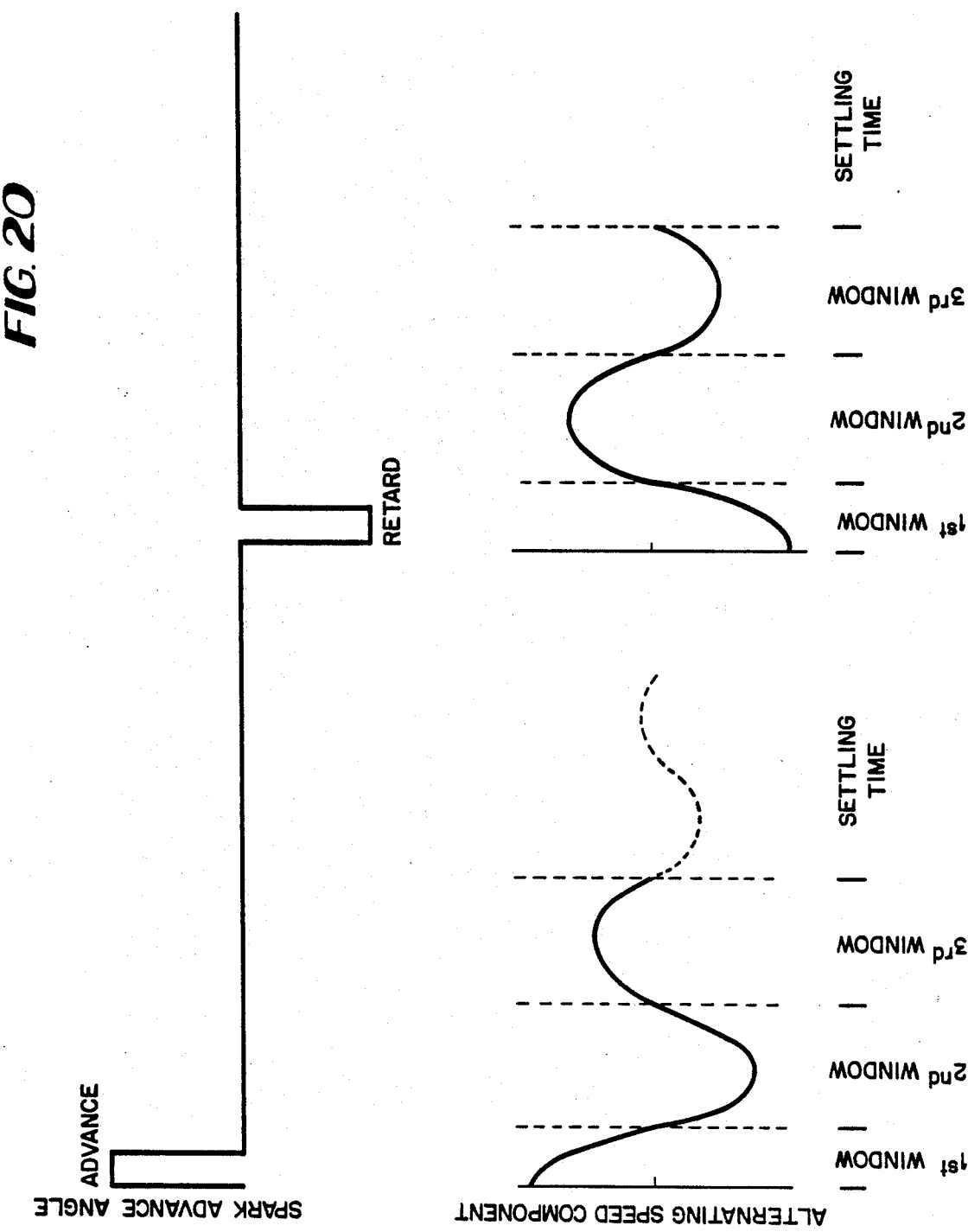
FIG. 20 shows graphs of perturbations applied to spark advance angle and the resulting changes in engine speed.

A simplified representation of the perturbation waveform and the resulting changes in engine speed are shown in FIG. 20. The speed response has been truncated after the first three peaks of the cosinusoid. In order to measure the slope, after each perturbation three measurement windows are established. The duration of each of these windows is a fraction of the resonant period of the resonant system which has already been discussed in connection with FIG. 1. Thus, the first measurement window is equal to one quarter of the resonant period, and the second and third windows are each equal to one half of this period. During each measurement window, the number of fires and the total fire periods are accumulated. As with the algorithm which is used at higher engine speeds, each fire period is associated with the time equivalent to 120° after top dead center of the cylinder over which it primarily occurs. This time is used to decide whether a fire period falls within the first, second or third measurement window or the settling time.

The fire periods falling in the first, second and third measurement windows are accumulated as variables T1, T2, and T3. The number of fires occurring in these three windows are accumulated as variables N1, N2 and N3. In addition, a variable SIGN has a value of unity for a retarded perturbation and a value of minus unity for an advance perturbation. The slope T' is then calculated as follow:

$$S1 = SIGN.(2.[(T1.N2) - (T2.N1)]$$
$$S2 = SIGN.[(T2.N3) - (T3.N2)]$$
$$T' = S2 - S1$$

S1 is calculated in the first fire within the third measurement window and includes a factor of 2 to compensate for the fact that the first measurement window is only one half of the duration of the other two windows. The calculation of S2 and T' is performed during the first fire after the end of the third measurement window and equivalent to the first fire within the settling time.

In order to evaluate the duration of each measurement window, the algorithm uses knowledge of the selected gear and looks at the corresponding resonant frequency.

Referring now specifically to FIG. 19, the algorithm commences with a step SA50 which checks if the algorithm variables should be reinitialized. If step SA50 is true, the variables are reinitialized in step SA51. The algorithm commences with an advanced perturbation.

In step SA52, a check is made to determine if the cylinder whose spark advance angle has been evaluated during the present pass through the module SAFIRE is the same as the cylinder whose spark advance angle is to be perturbed. If step SA52 is true, step SA53 checks if a perturbation is due. As explained above, the cylinder is perturbed only once for each evaluation of T'. If the result of step SA53 is true, steps SA54, SA55, SA56 and SA57 are executed.

Step SA54 records the time at which the perturbation decision took place. Step SA55 records the time at which the first measurement window associated with this perturbation should commence. This is to compensate for the delay between the calculation of a spark advance angle and implementing the spark advance angle as described above with reference to the algorithm which is used at higher engine speeds. With the present algorithm, it is assumed that the speed response is cosinusoidal and so no further phase shift is introduced. Step SA56 sets a flag to indicate that a perturbation has occurred and changes the sign of the flag which controls the polarity of the perturbation. In step SA57, the spark advance angle is modified so as to include the perturbation.

After step SA57, or after either of steps SA52 or SA53 if these steps are false, the program continues with a step SA58. In step SA58, as will be described with reference to FIG. 21, the slope is evaluated. After step SA58, the algorithm terminates.

Figure 21:
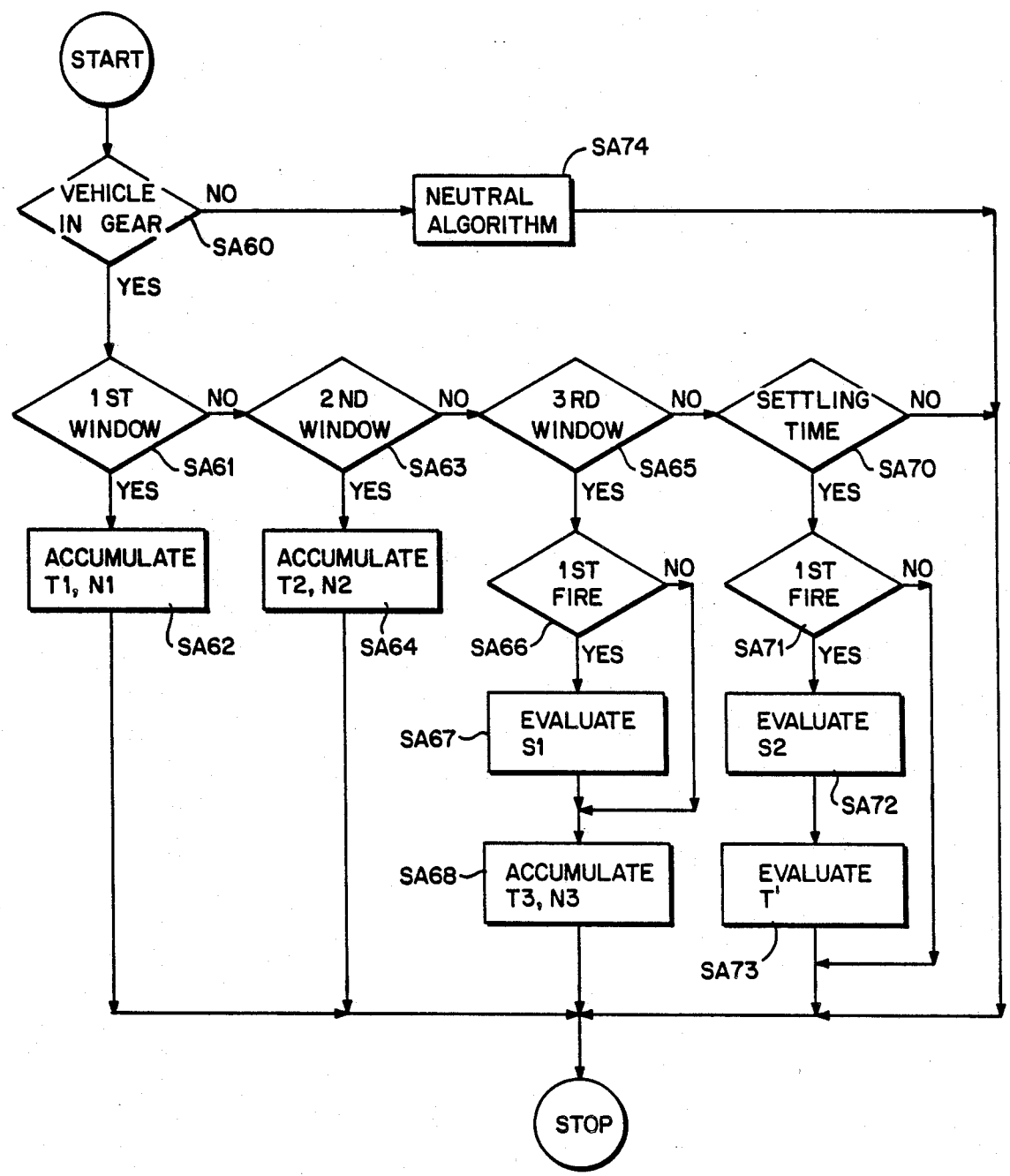
FIG. 21 is a flow chart of a further part of the program.

Referring now to FIG. 21, there is shown the measurement of the slope indicated as step SA58 in FIG. 19. The measurement commences with step SA60 in which it is determined if the vehicle is in gear. If the vehicle is in gear, in a step SA61, it is determined if the present fire falls within the first window. If it does, in a step SA62, the variables T1 and N1 are accumulated.

If step SA61 is false, in a step SA63 it is determined if the present fire is the second measurement window. If it is, in a step SA64 the variables T2 and N2 are accumulated.

If step SA63 is false, in a step SA65 it is determined if the present fire falls within the third window. If it does, in a step SA66 it is determined if this is the first fire of the third measurement window. If step SA66 is true, in a step SA67 third measurement window. If step SA66 is true, in a step SA67 the variable S1 is evaluated as set out above. After step SA67, or after step SA66 if this step is false, in a step SA68 the variables T3 and N3 are accumulated.

If step SA65 is false, in a step SA70 it is determined if the present fire falls within the settling time. If it does, it is determined if this is the first fire of the settling time. If it is, in a step SA73, the slope T' is evaluated. The value of T' is used in step SA73 to store the correction values in the appropriate look-up table. Thus, consecutive values of T' have been evaluated from consecutive advanced and retarded perturbations. If either step SA70 or SA71 is false, the measurement terminates.

If step SA60 is false, either the gearbox will be in neutral or the clutch will be disengaged. Consequently, a non-sinusoidal speed resonse is expected in which the speed increases where the perturbation is in the direction of improved torque or decreases if the perturbation in the direction away from peak torque. In step SA74, the slope is calculated from the change in speed following each perturbation.

Various modifications to the embodiment given above are envisioned and these will now be discussed.

In the above embodiment, the spark advance angle of each cylinder in turn is perturbed. By way of modification, the cylinders could be arranged into a set of combinations, and the spark advance angle of each combination could then be perturbed in turn. For example, for a four cylinder engine, the cylinders could be divided into four sets of three cylinders, and each of these sets is then perturbed in turn.

Although in the embodiment given above, the spark advance angle is perturbed and corrections are calculated with the spark advance angle, neither the perturbation nor the corrections are limited to this particular parameter. For example, the spark advance angle could be perturbed and corrections applied to the air/fuel ratio or the spark advance angle could be perturbed and the slope measurements used to apply corrections to both the spark advance angle and the air/fuel ratio.

Examples of other parameters which could be perturbed or corrected include injection timing in a diesel engine and, in engines in which part of the exhaust gas is recirculated with the intake air, the ratio of exhaust gas to intake air.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

We claim:

1. An adaptive control system for a power producing engine having at least one engine control parameter affecting an engine output, said engine having a drive train combination having at least one resonant frequency, said control system comprising:
   (a) a perturbation generator for perturbing intermittently a particular said engine control parameter about a base line value in at least one perturbation mode in a given operating mode of said engine which includes said at least one resonant frequency;
   (b) measuring means for measuring a slope of said engine output with respect to said particular control parameter caused by said perturbation generator; and
   (c) control means, responsive to said slope, for controlling one said engine control parameter so as to obtain a desired value of said slope, wherein said perturbation generator operates in another perturbation mode in another operating mode of said engine to perturb said particular control parameter at a frequency greater than said at least one resonant frequency.

2. The system as in claim 1, wherein said engine is an internal combustion engine and said perturbation generator in said at least one perturbation mode (a) perturbs said particular control parameter with a first perturbation, (b) permits a predetermined period to elapse without perturbing said particular control parameter, (c) perturbs said particular control parameter with a second perturbation of opposite polarity to that of said first perturbation, and (d) permits another predetermined period to elapse without perturbing said particular engine control parameter.

3. The system as in claim 2, wherein said another operating mode is an upper speed range of said engine and said given operating mode is a lower speed range of said engine.

4. The system as in claim 1, wherein said particular control parameter and said one control parameter are the same.

5. An adaptive control system for a power producing engine having at least one engine control parameter affecting an engine output, said engine having a drive train combination having at least one resonant frequency, said control system comprising:
   (a) a perturbation generator for perturbing intermittently a particular said engine control parameter about a base line value in at least one perturbation mode in a given operating mode of said engine which includes said at least one resonant frequency;
   (b) measuring means for measuring a slope of said engine output with respect to said particular control parameter caused by said perturbation generator; and
   (c) control means, responsive to said slope, for controlling one said engine control parameter so as to obtain a desired value of said slope, wherein said particular control parameter and said one control parameter are different.

6. The system as in claim 2, wherein said measuring means in a measurement mode corresponding to said at least one perturbation mode creates a series of measurement windows following each perturbation of said particular control parameter, each of said series of measurement windows occupying part of an interval between successive perturbations of said particular control parameter, said measuring means calculating said slope in accordance with a change in engine output between adjacent ones of said series of measurement windows.

7. The system as in claim 2, wherein said perturbation generator in said another perturbation mode generates a periodic perturbation waveform having said frequency greater than said resonant frequency and applies a first perturbation to said particular control parameter during a first part of each period of said waveform and a second perturbation of opposite polarity to that of said first perturbation to said particular control parameter during a second part of each period of said waveform.

8. The system as in claim 7, wherein said measuring means in a measurement mode corresponding to said another perturbation mode creates a series of contiguous first and second measurement windows associated respectively with said first part and said second part of said period of said perturbation waveform, each of said measurement windows in said series lagging its associated part of said period of said perturbation waveform by a predetermined phase shift.

9. The system as in claim 2, further comprising cylinder combination selection means for establishing a plurality of cylinder combinations of said engine and for selecting each combination in turn, each of said cylinder combinations comprising at least one cylinder, said perturbation generator perturbing in both said at least one perturbation mode and said another perturbation mode each of said cylinder combinations in turn at the time it is selected by said selection means, said measuring means measures said slope for each of said cylinder combinations in turn, and said correction means corrects at least one said control parameter for each cylinder combination in turn.

10. An adaptive control system for a multi-cylinder internal combustion engine having at least one engine control parameter affecting an engine output, said control system comprising:
   (a) cylinder combination selection means for establishing a plurality of combinations of cylinders of said engine and for selecting each combination in turn, each of said combinations of cylinders including at least one cylinder;
   (b) a perturbation generator for perturbing a particular said engine control parameter of each of said combinations of cylinders at the time it is selected by said cylinder combination selection means, said perturbation generator operating in a first perturbation mode in an upper speed range of said engine and in a second perturbation mode in a lower speed range of said engine;
   (c) measuring means for measuring a slope or differential of said engine output with respect to perturbations in said particular engine control parameter caused by said perturbation generator for each of said combinations in turn, said measuring means operating in a first measurement mode corresponding to said first perturbation mode and a second measurement mode corresponding to said second perturbation mode; and (d) correction means, responsive to said slope, for correcting at least one said control parameter for each of said combinations of cylinders of said engine so as to obtain a desired value of said slope.

11. The system as in claim 10, wherein (i) said perturbation generator in said first perturbation mode generates a periodic perturbation waveform and applies a first perturbation to said particular control parameter during a first part of each period of said perturbation waveform and a second perturbation of opposite polarity to that of said first perturbation to said particular control parameter during a second part of each period of said perturbation waveform, (ii) said perturbation generator in said second perturbation mode applies a third perturbation to said particular control parameter, permits a predetermined period to elapse without perturbing said particular control parameter, applies a fourth perturbation of opposite polarity to that of said third perturbation to said particular control parameter, and permits another predetermined period to elapse without perturbing said particular control parameter, (iii) said measuring means in said first measurement mode creates a first series of contiguous first and second measurement windows associated respectively with said first part and said second part of said period of said perturbation waveform, each of said measurement windows in said first series lagging its associated part of said period of said perturbation waveform by a predetermined phase shift, said measuring means calculating said slope in accordance with a change in engine output between contiguous ones of said measurement windows in said first series, and (iv) said measuring means in said second measurement mode creates a second series of measurement windows following each perturbation of said particular control parameter, each of said second series of measurement windows occupying part of an interval between successive perturbations of said particular control parameter, said measuring means calculating said slope in accordance with a change in engine output between adjacent ones of said second series of measurement windows.

12. The system as in claim 11, wherein said internal combustion engine includes a flywheel, a resilient shaft means connected to said flywheel, and a gear means connected to said shaft means; said flywheel, said shaft means and said gear means forming a resonant system having a particular resonant frequency for each gear ratio of said gear means, and wherein said periodic perturbation waveform is caused to have a frequency greater than a highest resonant frequency of said resonant system when said engine is in said upper speed range and each measurement window in said second series of measurement windows is equal to a whole number of quarters of said resonant frequency of said resonant system corresponding to a current gear ratio of said gear means.

13. The system as in claim 11, wherein in both said first measurement mode and said second measurement mode said measuring means accumulates respectively during each window of said first series of measurement windows and said second series of measurement windows the fire periods having central points which fall within each window to produce a total fire period for each window, said measuring means calculating said slope in accordance with said total fire period for each window.

14. The system as in claim 10 or 11, wherein said perturbation generator operates in a third perturbation mode when one of (i) said engine is in neutral and (ii) a clutch associated with said engine is disengaged, and said measuring means operates in a third measurement mode corresponding to said third perturbation mode.

15. The system as in claim 10 or 11, wherein each of said combinations comprises a single cylinder.

16. The system as in claim 10 or 11, wherein each of said cylinder combinations comprises all cylinders of said engine except one.

17. The system as in claim 10 or 11, further comprising means for establishing a value of said at least one control parameter prior to correction by said correction means as a function of engine output and load on said engine.

18. The system as in claim 10 or 11, wherein said particular control parameter perturbed by said perturbation means is an ignition timing parameter.

19. The system as in claim 10 or 11, wherein a single control parameter is corrected by said correction means and both said particular control parameter perturbed by said perturbation means and said control parameter corrected by said correction means are an ignition timing parameter.

20. The system as in claim 10 or 11, wherein said particular control parameter perturbed by said perturbation means is an ignition timing parameter and said control parameter corrected by said correction means is a single engine fuel control parameter.

21. The system as in claim 10 or 11, wherein said particular control parameter perturbed by said perturbation means is an ignition timing parameter and said correction means corrects two said control parameters comprising an ignition timing parameter and an engine fuel control parameter.

22. An adaptive control system for a multi-cylinder, fuel injected, spark ignition, internal combustion engine comprising a flywheel, a resilient shaft connected to said flywheel, a gear means connected to said resilient shaft and a crankshaft, said engine having an engine output affected by at least one control input, said control system comprising:

(a) a position transducer for producing a series of reference pulses representing rotational positions of said crankshaft;
(b) a control means, responsive to said position transducer, for providing output signals for controlling at least one said control input;
(c) an engine speed calculation means, responsive to said position transducer, for providing an output signal indicating engine speed to said control means;
(d) cylinder synchronization means, responsive to said position transducer, for determining which cylinder is undergoing a combustion stroke;
(e) gear indication means for indicating which gear of said engine is presently engaged;
(f) load demand transducer means for sensing a load demand parameter of said engine;
(g) fire period calculation means, responsive to said position transducer, for calculating a period which elapses between pistons in consecutive cylinders of said engine being at a given angular position after top dead center;

(h) a first memory means storing data representing a particular control input of said engine as a function of engine speed and load demand;

(i) a first calculation means, responsive to (i) said engine speed calculation means, (ii) said load demand transducer and (iii) said first memory means, for calculating a basic value for said particular control input corresponding to prevailing engine speed and load demand;

(j) a second memory means storing data representing a second control input of said engine as a function of engine speed and load demand;

(k) a second calculation means, responsive (i) said engine speed calculation device, (ii) said load demand transducer, and (iii) said second memory means, for calculating a basic value for said second control input corresponding to prevailing engine speed and load demand;

(l) perturbation means, responsive to (i) said gear indication means, (ii) said fire period calculation means, and (iii) said cylinder synchronization means, for operating in at least one perturbation mode in a given operating mode of said engine including a highest resonant frequency of a resonant system comprising said flywheel, said resilient shaft means and said gear means in an lower speed range of said engine perturbing said particular control input to each cylinder of said engine in synchronization with the time it is undergoing a combustion stroke at an intermittent frequency which is a function of outputs from said gear determination means and said fire period calculation means;

(m) measuring means for sensing a slope in said engine output with respect to said particular control input resulting from perturbations caused by said perturbation means;

(n) third memory means comprising individual correction memories for each individual cylinder;

(o) selector means, responsive to said cylinder synchronization means, for selective connection to said individual correction memories;

(p) third calculation means, responsive to said load demand transducer and said engine speed calculation device and connected to said selector means so as to selectively receive said correction values from said individual correction memories through said selector means, for calculating a correction value for said second control input for each individual cylinder immediately prior to its firing; and (q) a first summer means for summing said basic value for said second control input and said correction value for said second control input relating to each individual cylinder immediately prior to its firing to provide an output to said control device.

23. The system as in claim 22, wherein said perturbation generator operates in another perturbation mode in another operating mode of said engine to perturb said particular control input at a frequency greater than said highest resonant frequency.

24. The system as in claim 22, wherein said particular control input and said second control input are the same control input, and further comprising a second summer receiving said output of said first summer means prior to its being provided to said control means and summing it with said output of said perturbation generator to provide an output to said control means.

25. The system as in claim 22, wherein said particular control input and said second control input are not the same control input.

26. The system as in claim 23, wherein (i) said perturbation generator in said another perturbation mode generates a periodic perturbation waveform having said frequency greater than said highest resonant frequency and applies a first perturbation to said particular control parameter during a first part of each period of said perturbation waveform and a second perturbation of opposite polarity to that of said first perturbation to said particular control parameter during a second part of each period of said perturbation waveform, (ii) said perturbation generator in said at least one perturbation mode applies a third perturbation to said particular control parameter, permits a predetermined period to elapse without perturbing said particular control parameter, applies a fourth perturbation of opposite polarity to that of said perturbation to said particular engine control parameter, and permits another predetermined period to elapse without perturbing said particular control parameter, (iii) said measuring means in a first measurement mode corresponding to said another perturbation mode creates a first series of contiguous first and second measurement windows associated respectively with said first part and said second part of said period of said perturbation waveform, each of said measurement windows in said first series lagging its associated part of said period of said perturbation waveform by a predetermined phase shaft, said measuring means calculating said slope in accordance with a change in engine output between contiguous ones of said measurement windows in said first series, and (iv) said measuring means in a second measurement mode corresponding to said second perturbation mode creates a at least one series of measurement windows following each perturbation of said particular control parameter, each of said a at least one series of measurement windows occupying part of an interval between successive perturbations of said particular control parameter, said measuring means calculating said slope in accordance with a change in engine output between adjacent ones of said a at least one series of measurement windows.

27. The system as in claim 26, wherein in both said first measurement code and said second measurement mode said measuring means accumulates respectively during each window of said first series of measurement windows and said second series of measurement windows the fire periods whose central points fall within each window to produce a total fire period for each window, said measuring means calculating said slope in accordance with said total fire period for each window.

28. A method of controlling a power producing engine having at least one engine control parameter affecting an engine output, said engine having a drive train combination having at least one resonant frequency, said method comprising:

(a) perturbing intermittently a particular said control parameter about a base line value in at least one perturbation mode in a given operating mode of said engine which includes said resonant frequency;

(b) measuring a slope of said engine output with respect to said particular control parameter; and (c) controlling one said control parameter so as to obtain a desired value of said slope, wherein step (a) includes perturbing said particular control parameter in another perturbation mode in another operating mode of said engine at a frequency greater than said resonant frequency.

29. The method as in claim 28, wherein said engine is an internal combustion engine and step (a) includes in the at least one perturbation mode (i) perturbing said particular control parameter with a first perturbation, (ii) permitting a predetermined period to elapse without perturbing said particular control parameter, (iii) perturbing said particular control parameter with a second perturbation having a polarity opposite that of said first perturbation, and (iv) permitting another predetermined period to elapse without perturbing said particular control parameter.

30. The method as in claim 29, wherein step (b) includes in a measurement mode corresponding to said at least one perturbation mode creating a series of measurement windows following each perturbation of said particular control parameter, each of said series of measurement windows occupying part of an interval between successive perturbations of said particular control parameter and measuring said slope in accordance with a change in engine output between adjacent ones of said series of measurement windows.

31. The method as in claim 29, wherein said another perturbation mode includes generating a periodic perturbation waveform having said frequency greater than said resonant frequency and applying a first perturbation to said particular control parameter during a first part of each period of said waveform and a second perturbation of opposite polarity to that of said first perturbation to said particular control parameter during a second part of each period of said waveform.

32. The method as in claim 31, wherein step (b) includes in a measurement mode corresponding to said another perturbation mode creating a series of contiguous first and second measurement windows associated respectively with said first part and said second part of said period of said perturbation waveform, each of said measurement windows in said series lagging its associated part of said period of said waveform by a predetermined phase shift.

33. The system as in claim 29, wherein said another operating mode is an upper speed range of said engine and said given operating mode is a lower speed range of said engine.

34. The method as in claim 28, wherein said particular control parameter and said one control parameter are the same.

35. A method of controlling a power producing engine having at least one engine control parameter affecting an engine output, said engine having a drive train combination having at least one resonant frequency, said method comprising:
   (a) perturbing intermittently a particular said control parameter about a base line value in at least one perturbation mode in a given operating mode of said engine which includes said resonant frequency;
   (b) measuring a slope of said engine output with respect to said particular control parameter; and
   (c) controlling one said control parameter so as to obtain a desired value of said slope, wherein said particular control parameter and said one control parameter are different.

36. A method of controlling a multi-cylinder internal combustion engine having an engine output affected by at least one engine control parameter, said method comprising:
   (a) establishing a plurality of combinations of cylinders of said engine, each of said combinations of cylinders including at least one cylinder;
   (b) selecting each of said combinations in turn;
   (c) perturbing a particular said control parameter of each of said combinations of cylinders at the time it is selected in step (b) by applying a first perturbation to said particular control parameter, permitting a period to elapse without perturbing said particular control parameter, applying a second perturbation of opposite polarity to that of said first perturbation to said particular control parameter and permitting another period to elapse without perturbing said particular control parameter;
   (d) creating a series of measurement windows following each perturbation of said particular control parameter, each series of measurement windows occupying part of the interval between successive perturbations;
   (e) calculating the slope of said engine output with respect to said particular control parameter for each of said combinations in turn from the change in engine output between adjacent measurement windows; and
   (f) applying a correction based on said slope to at least one said control parameter associated with the currently selected cylinder combination.

37. A method of controlling a multi-cylinder internal combustion engine having an engine output affected by at least one engine control parameter, said method comprising:
   (a) establishing a plurality of combinations of cylinders of said engine, each of said combinations of cylinders including at least one cylinder;
   (b) selecting each of said combinations in turn;
   (c) when said engine is in an upper speed range, perturbing a particular said control parameter of each of said combinations of cylinders at the time it is selected in step (b) by generating a periodic perturbation waveform and applying a first perturbation to said particular control parameter during a first part of each period of said perturbation waveform and a second perturbation of opposite polarity to that of said first perturbation during a second part of said perturbation waveform;
   (d) when said engine is in a lower speed range, perturbing said particular control parameter of each of said combinations of cylinders at the time it is selected in step (b) by applying a first perturbation to said particular control parameter, permitting a period to elapse without perturbing said particular control parameter, applying a second perturbation of opposite polarity to that of said first perturbation to said particular control parameter and permitting another period to elapse without perturbing said particular control parameter;
   (e) in said upper speed range, creating a first series of contiguous first and second measurement windows associated respectively with said first and second parts of the perturbation waveform, each measurement window lagging its respective part of the perturbation waveform by a predetermined phase shift;
   (f) in said lower speed range, creating a second series of measurement windows following each perturbation of said particular control parameter, each series of measurement windows occupying part of the interval between successive perturbations;

(g) in both said upper and lower speed ranges, calculating the slope of engine output with respect to said particular control parameter for each of said combinations in turn from the change in engine speed between adjacent measurement windows; and (h) applying a correction based on said slope to at least one said engine control parameter associated with the currently selected cylinder combination.

38. The method as in claim 37, wherein said internal combustion engine includes a flywheel, a resilient shaft means connected to said flywheel, and a gear means connected to said shaft means, said flywheel, said shaft means and said gear means forming a resonant system having a particular resonant frequency for each gear ratio of said gear means, and wherein said periodic perturbation waveform is caused to have a frequency greater than a highest resonant frequency of said resonant system when said engine is in said upper speed range, and each measurement window in said second series of measurement windows is equal to a whole number of quarters of said resonant frequency of said resonent system corresponding to a current gear ratio of said gear means.

39. The method as in claim 37, wherein step (g) includes accumulating respectively during each window of said first series of measurement windows and said second series of measurement windows the fire periods having central points which fall within each window to produce a total fire period for each window, so that said slope is calculated in accordance with said total fire period for each window.

40. The method as in claim 36 or 37, wherein each of said combinations comprises a single cylinder.

41. The method as in claim 36 or 37, wherein each of said cylinder combinations comprises all cylinders of said engine except one.

42. The method as in claim 36 or 37, wherein a value of said at least one control parameter is established prior to its being corrected in step (f) as a function of engine output and load on said engine.

43. The method as in claim 36 or 37, wherein said particular control parameter is an ignition timing parameter.

44. The method as in claim 36 or 37, wherein step (f) or step (h) respectively includes correcting a single engine parameter and wherein both said particular control parameter and said at least one control parameter corrected in step (f) or step (h) respectively are an ignition timing parameter.

45. The method as in claim 36 or 37, wherein said particular control parameter is an ignition timing parameter and said at least one control parameter corrected in step (f) or step (h) respectively is a single engine fuel control parameter.

46. The method as in claim 36 or 37, wherein said particular control parameter is an ignition timing parameter and step (f) or step (h) respectively includes correcting two said control parameters comprising an ignition timing parameter and an engine fuel control parameter.

* * * * *